(12) United States Patent
Tanaka et al.

(10) Patent No.: US 8,809,440 B2
(45) Date of Patent: Aug. 19, 2014

(54) METHOD OF PRODUCING MODIFIED CONJUGATED DIENE RUBBER, MODIFIED CONJUGATED DIENE RUBBER, AND RUBBER COMPOSITION

(75) Inventors: Ryouji Tanaka, Tokyo (JP); Masahiro Shibata, Tokyo (JP); Takahiro Nakamura, Tokyo (JP); Kenji Hasegawa, Tokyo (JP); Toshihiro Tadaki, Tokyo (JP)

(73) Assignee: JSR Corporation, Tokyo (JP)

( * ) Notice: Subject to any disclaimer, the term of this patent is extended or adjusted under 35 U.S.C. 154(b) by 83 days.

(21) Appl. No.: 13/503,205

(22) PCT Filed: Oct. 21, 2010

(86) PCT No.: PCT/JP2010/068621
§ 371 (c)(1),
(2), (4) Date: Jul. 12, 2012

(87) PCT Pub. No.: WO2011/049180
PCT Pub. Date: Apr. 28, 2011

(65) Prior Publication Data
US 2012/0270997 A1 Oct. 25, 2012

(30) Foreign Application Priority Data
Oct. 21, 2009 (JP) .................................. 2009-242041

(51) Int. Cl.
| | | |
|---|---|---|
| *C08F 279/02* | (2006.01) | |
| *C08K 3/04* | (2006.01) | |
| *C08K 3/36* | (2006.01) | |
| *C08L 9/06* | (2006.01) | |
| *C08L 15/00* | (2006.01) | |
| *C08L 25/10* | (2006.01) | |
| *C08F 236/10* | (2006.01) | |

(52) U.S. Cl.
CPC ... *C08K 3/04* (2013.01); *C08K 3/36* (2013.01); *C08L 9/06* (2013.01); *C08L 15/00* (2013.01); *C08L 25/10* (2013.01); *C08F 236/10* (2013.01)
USPC ........... 524/495; 524/492; 524/572; 524/783; 525/331.9; 525/102

(58) Field of Classification Search
USPC ................. 524/492, 495, 572, 783; 525/331.9
See application file for complete search history.

(56) References Cited

U.S. PATENT DOCUMENTS

| | | |
|---|---|---|
| 2004/0254301 A1 | 12/2004 | Tsukimawashi et al. |
| 2005/0020757 A1* | 1/2005 | Ozawa et al. ................. 524/492 |
| 2011/0146877 A1* | 6/2011 | Tanaka et al. ................. 152/547 |
| 2013/0023623 A1* | 1/2013 | Nakamura et al. ............ 524/572 |

FOREIGN PATENT DOCUMENTS

| | | |
|---|---|---|
| JP | 2004 18795 | 1/2004 |
| JP | 2004 51757 | 2/2004 |
| JP | 2005 290355 | 10/2005 |
| WO | 03 048216 | 6/2003 |
| WO | 2009 113546 | 9/2009 |
| WO | WO 2009113546 A1 * | 9/2009 |
| WO | 2010 061802 | 6/2010 |

OTHER PUBLICATIONS

International Search Report Issued Jan. 25, 2011 in PCT/JP10/68621 Filed Oct. 21, 2010.
U.S. Appl. No. 13/638,767, filed Oct. 1, 2012, Nakamura, et al.

* cited by examiner

*Primary Examiner* — Ling Choi
*Assistant Examiner* — Ronald Grinsted
(74) *Attorney, Agent, or Firm* — Oblon, Spivak, McClelland, Maier & Neustadt, L.L.P.

(57) ABSTRACT

There is provided a method of producing a conjugated diene rubber capable of being used as a starting material for a crosslinked rubber that can be used in applications such as tire treads and can raise the fuel efficiency. This method of producing a conjugated diene rubber comprises (a) a step of reacting a first alkoxysilane compound having in a molecule at least one group convertible to onium by an onium generator and at least one alkoxysilyl group that has at least two alkoxy groups, with a conjugated diene polymer having an alkali metal or alkaline-earth metal active terminal and obtained by polymerizing a conjugated diene compound and an aromatic vinyl compound, thereby to obtain a modified conjugated diene polymer that has the group convertible to onium and the alkoxysilyl group, and (b) a step of mixing the resulting modified conjugated diene polymer with the onium generator and a second alkoxysilane compound having in a molecule at least one alkoxysilyl group and at least one group convertible to onium by the onium generator.

19 Claims, No Drawings

METHOD OF PRODUCING MODIFIED CONJUGATED DIENE RUBBER, MODIFIED CONJUGATED DIENE RUBBER, AND RUBBER COMPOSITION

TECHNICAL FIELD

The present invention relates to a method of producing a modified conjugated diene rubber, a modified conjugated diene rubber, and a rubber composition. More particularly, the present invention relates to a method of producing a modified conjugated diene rubber that has an excellent shape retention performance and that can produce a crosslinked rubber that exhibits an excellent tensile strength, wear resistance (i.e. abrasion resistance), and wet skid resistance and an excellent low hysteresis loss behavior; to a modified conjugated diene rubber obtained by the production method; to a rubber composition containing the modified conjugated diene rubber; and to a crosslinked rubber composition (vulcanized rubber composition) obtained by the crosslinking (for example, vulcanization) of the rubber composition.

BACKGROUND ART

Conjugated diene rubbers (for example, styrene-butadiene copolymers) obtained by emulsion polymerization methods are known as rubbers for automotive tire applications. A variety of conjugated diene rubbers that can realize an excellent fuel efficiency performance have been introduced in recent years amid the expectations for improved automotive fuel efficiencies.

As an example, a conjugated diolefin (co)polymer rubber with the following characteristics (1) to (3) has been proposed: (1) it is a (co)polymer rubber of a conjugated diolefin or a conjugated diolefin and an aromatic vinyl compound; (2) it has a primary amino group and an alkoxysilyl group bonded in the (co)polymer chain; and (3) an at least difunctional monomer is copolymerized in the (co)polymer chain, and/or, at least a portion of the (co)polymer chain is coupled with an at least difunctional coupling agent (see Patent Reference 1).

In another example, a modified diene polymer rubber is proposed that is obtained by a step 1 of obtaining an active polymer having an alkali metal terminal by polymerizing a conjugated diene monomer or a conjugated diene monomer and an aromatic vinyl monomer in a hydrocarbon solvent in the presence of an alkali metal catalyst, and a step 2 of obtaining a modified polymer rubber by reacting the active polymer with a compound that has a specific formula (see Patent Reference 2).

A method has also been proposed for producing a modified polymer that has an increased interaction with silica and carbon black and that can provide improved failure characteristics and wear resistance and an improved low heat build-up performance. This method proceeds through a primary modification reaction, in which a hydrocarbyloxysilane compound is reacted with the active site of a polymer that has an organometal active site in the molecule, and through a subsequent secondary modification reaction, in which a hydrocarbyloxysilane compound is reacted via a condensation reaction between hydrocarbyloxysilyl groups (see Patent Reference 3).

RELATED ART REFERENCES

List of Patent References

Patent Reference 1: Japanese Patent Application Laid-open No. 2004-18795

Patent Reference 2: Japanese Patent Application Laid-open No. 2005-290355

Patent Reference 3: WO 03/048216 A1

SUMMARY OF THE INVENTION

Problems to be Solved by the Invention

As noted above, a variety of conjugated diene rubbers have been introduced that can realize an excellent automotive fuel efficiency performance. However, additional improvements in automotive fuel efficiency are anticipated in view of economic considerations such as the steep increase in gasoline prices and in view of environmental considerations starting with carbon dioxide emissions. An object of the present invention is therefore to provide a method of producing a modified conjugated diene rubber capable of being used as a starting material for a crosslinked rubber that can be used in applications such as automotive tires and that can raise the fuel efficiency in, for example, automobiles.

Means for Solving the Problems

As a result of intensive investigations in order to solve the problems described above, the inventors discovered that properties such as an excellent low hysteresis loss behavior are imparted by using an onium generator and two special types of alkoxysilane compounds in addition to a conjugated diene polymer having an alkali metal active terminal, and that, as a result, a modified conjugated diene rubber can be produced that has the ability to provide an excellent fuel efficiency when used in, for example, automotive tires. The present invention was achieved based on these discoveries.

Thus, the present invention provides the following [1] to [10].

[1] A method of producing a modified conjugated diene rubber, comprising:

(a) a step of reacting a first alkoxysilane compound having in a molecule at least one group convertible to onium by an onium generator and at least one alkoxysilyl group that has at least two alkoxy groups, with a conjugated diene polymer having an alkali metal or alkaline-earth metal active terminal and obtained by polymerizing a conjugated diene compound or a conjugated diene compound and an aromatic vinyl compound, thereby to obtain a modified conjugated diene polymer that has the group convertible to onium and the alkoxysilyl group; and (b) a step of mixing the modified conjugated diene polymer obtained in step (a) with the onium generator and a second alkoxysilane compound having in a molecule at least one alkoxysilyl group and at least one group convertible to onium by the onium generator.

[2] The method of producing a modified conjugated diene rubber according to [1], wherein the group convertible to onium in the first alkoxysilane compound is at least one type selected from the group consisting of nitrogenous groups obtained by substituting two hydrogen atoms on a primary amine with two protective groups, nitrogenous groups obtained by substituting one hydrogen atom on a secondary amine with one protective group, tertiary amino groups, imino groups, pyridyl groups, phosphorus-containing groups obtained by substituting two hydrogen atoms of a primary phosphine with two protective groups, phosphorus-containing groups obtained by substituting one hydrogen atom of a secondary phosphine with one protective group, tertiary phosphino groups, and sulfur-containing groups obtained by substituting one hydrogen atom on a thiol with one protective group.

[3] The method of producing a modified conjugated diene rubber according to [1] or [2], wherein the onium generator is at least one type selected from the group consisting of silicon halide compounds, tin halide compounds, aluminum halide compounds, titanium halide compounds, zirconium halide compounds, germanium halide compounds, gallium halide compounds, zinc halide compounds, sulfate esters, phosphate esters, carboxylic acids, and sulfonic acids.

[4] The method of producing a modified conjugated diene rubber according to any of [1] to [3], wherein the group convertible to onium in the second alkoxysilane compound is at least one type selected from the group consisting of primary amino groups, secondary amino groups, tertiary amino groups, imino groups, pyridyl groups, primary phosphino groups, secondary phosphino groups, tertiary phosphino groups, and thiol groups.

[5] The method of producing a modified conjugated diene rubber according to any of [1] to [4], further comprising:
(c) a step of bringing a mixture obtained in step (b) into contact with water.

[6] The method of producing a modified conjugated diene rubber according to any of [1] to [5], wherein the modified conjugated diene rubber contains the aforementioned modified conjugated diene polymer, the aforementioned second alkoxysilane compound, and a hydrolysis and condensation product from the modified conjugated diene polymer and the second alkoxysilane compound, and has onium structures formed by these three materials.

[7] A modified conjugated diene rubber obtained by the method of producing a modified conjugated diene rubber according to any of [1] to [6].

[8] A rubber composition comprising the modified conjugated diene rubber according to [7], a silica and/or a carbon black, and a crosslinking agent.

[9] A crosslinked rubber composition obtained by crosslinking the rubber composition according to [8].

[10] A tire comprising the crosslinked rubber composition according to [9].

Effects of the Invention

The production method of the present invention can provide a modified conjugated diene rubber that can produce a crosslinked rubber composition that exhibits an excellent low hysteresis loss behavior. At the same time, the production method of the present invention can provide a modified conjugated diene rubber that exhibits an excellent shape retention and can provide a modified conjugated diene rubber that can produce a crosslinked rubber that exhibits an excellent tensile strength, wear resistance, and wet skid resistance.

The crosslinked rubber composition produced using this modified conjugated diene rubber can be used, for example, for automotive tires, and can raise the fuel efficiency of, for example, automobiles.

EMBODIMENTS FOR CARRYING OUT THE INVENTION

The method of the present invention for producing a modified conjugated diene rubber comprises (a) a step of reacting a first alkoxysilane compound having in a molecule at least one group convertible to onium by an onium generator and at least one alkoxysilyl group that has at least two alkoxy groups, with a conjugated diene polymer having an alkali metal or alkaline-earth metal active terminal and obtained by polymerizing a conjugated diene compound or a conjugated diene compound and an aromatic vinyl compound, to thereby obtain a modified conjugated diene polymer that has the group convertible to onium and the alkoxysilyl group; and (b) a step of mixing the modified conjugated diene polymer obtained in step (a) with the onium generator and a second alkoxysilane compound having in a molecule at least one alkoxysilyl group and at least one group convertible to onium by the onium generator.

[1] The method of producing a modified conjugated diene rubber is as follows.

[Step (a)]

Step (a) is a step of reacting a first alkoxysilane compound having in a molecule at least one group convertible to onium by an onium generator and at least one alkoxysilyl group that has at least two alkoxy groups, with a conjugated diene polymer having an alkali metal or alkaline-earth metal active terminal and obtained by polymerizing a conjugated diene compound or a conjugated diene compound and an aromatic vinyl compound, to thereby obtain a modified conjugated diene polymer that has the group convertible to onium and the alkoxysilyl group.

The conjugated diene polymer having an alkali metal or alkaline-earth metal active terminal is, for example, an anionic polymer obtained by the homopolymerization of a conjugated diene compound or by the copolymerization of a conjugated diene compound and an aromatic vinyl compound.

The method for producing the conjugated diene polymer should carry out an anionic polymerization mediated by an alkali metal or alkaline-earth metal (also referred to below as the "polymerization initiator") as noted above, but is not otherwise particularly limited. For example, the polymerization method can be a solution polymerization method, gas-phase polymerization method, or bulk polymerization method. Among these methods, solution polymerization methods is particularly preferred. The polymerization regime may be either batch or continuous. The metal at the active site present in the conjugated diene polymer molecule is an alkali metal or alkaline-earth metal. Among these, lithium, sodium, potassium, magnesium, and barium are preferred and lithium is particularly preferred. These alkali metals and alkaline-earth metals all have the same functionality in terms of enabling the production of a conjugated diene polymer that has a metal active terminal that is reactive with the first alkoxysilane compound, and those species not explored in the examples below can also be used in the present invention.

In addition, it is also effective to incorporate a functional group-containing monomer and to activate the functional group in the polymer using an alkali metal-type initiator. For example, an active site can be effectively generated by lithiating the functional group moiety of a copolymer that contains the isobutylene unit, para-methylstyrene unit, and para-halomethylstyrene unit.

The following compounds, for example, are suitably used as the conjugated diene monomer: 1,3-butadiene, isoprene, 2,3-dimethyl-1,3-butadiene, 1,3-pentadiene, 1,3-hexadiene, 1,3-heptadiene, 2,3-dimethylbutadiene, 2-phenyl-1,3-butadiene, 3-methyl-1,3-pentadiene, 2-chloro-1,3-butadiene, and so forth. A single one of these may be used or two or more may be used in combination. Among these compounds, the use of 1,3-butadiene, isoprene, or 2,3-dimethyl-1,3-butadiene is particularly suitable. These conjugated diene monomers all have the same functionality in terms of enabling the production of a conjugated diene polymer that has a metal active terminal that is reactive with the first alkoxysilane compound, and those species not explored in the examples below can also be used in the present invention.

Suitable aromatic vinyl compounds are, for example, styrene, 2-methylstyrene, 3-methylstyrene, 4-methylstyrene, α-methylstyrene, 2,4-dimethylstyrene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl)dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinylpyridine, diphenylethylene, diphenylethylene containing a tertiary amino group, and so forth. A single one of these may be used or two or more may be used in combination. Styrene is particularly preferred among these compounds. These aromatic vinyl compounds all have the same functionality in terms of enabling the production of a conjugated diene polymer that has a metal active terminal that is reactive with the first alkoxysilane compound, and those species not explored in the examples below can also be used in the present invention.

When a copolymerization is carried out using a conjugated diene monomer and an aromatic vinyl compound, 1,3-butadiene and styrene are preferably used, respectively. These monomers are easy to acquire and are excellent in terms of having a high living activity in anionic polymerization. When a solution polymerization method is employed, the monomer concentration in the solvent, when viewed from the perspective of maintaining a balance between productivity and ease of controlling the polymerization, is preferably 5 to 50 mass % and more preferably is 10 to 30 mass %. When a copolymerization is run by using a conjugated diene monomer and an aromatic vinyl compound, the aromatic vinyl compound content in the charged monomer mixture—when viewed from the perspective of maintaining a balance between the wet skid resistance and the low hysteresis loss behavior of the resulting crosslinked rubber composition—is preferably 3 to 55 mass % and more preferably is 5 to 50 mass %.

The compound used as the alkali metal or alkaline-earth metal initiator can be exemplified by alkyllithium, alkylenedilithium, lithium alkyleneimide, lithium dialkylamide, phenyllithium, stilbenelithium, lithium naphthalene, sodium naphthalene, potassium naphthalene, n-butylmagnesium, n-hexylmagnesium, ethoxycalcium, calcium stearate, t-butoxystrontium, ethoxybarium, isopropoxybarium, ethylmercapto barium, t-butoxybarium, phenoxybarium, diethylamino barium, barium stearate, ketylbarium, sodium biphenyl, potassium-tetrahydrofuran complex, potassium diethoxyethane complex, the sodium salt of α-methylstyrene tetramer, and so forth. Among these compounds, organolithium compounds such as alkyllithiums, and lithium amide compounds such as lithium alkyleneimides and so forth are preferred examples. When the former (i.e. organolithium compound) is used, a conjugated diene polymer that has a hydrocarbyl group at the polymerization initiation terminal and a polymerization active site at the other terminal is obtained. When the latter (i.e. lithium amide compound) is used, a conjugated diene polymer that has a nitrogenous group at the polymerization initiation terminal and a polymerization active site at the other terminal is obtained. These alkali metal initiators and alkaline-earth metal initiators all have the same functionality in terms of enabling the production of a conjugated diene polymer that has a metal active terminal that is reactive with the first alkoxysilane compound, and those species not explored in the examples below can also be used in the present invention.

The organolithium compound preferably has a $C_{1-20}$ hydrocarbyl group (i.e. a hydrocarbyl group having 1 to 20 carbon atoms). For example, methyllithium, ethyllithium, n-propyllithium, iso-propyllithium, n-butyllithium, sec-butyllithium, tert-octyllithium, n-decyllithium, phenyllithium, 2-naphthyllithium, 2-butylphenyllithium, 4-phenylbutyllithium, cyclohexyllithium, the reaction product of diisopropenylbenzene with butyllithium, t-butyllithium, n-hexyllithium, benzyllithium, phenyllithium, stilbenelithium, 1,4-dilithiobutane, 1,3,5-trilithiobenzene, the reaction product of n-butyllithium with 1,3-butadiene and divinylbenzene, the reaction product of n-butyllithium and a polyacetylene compound, 4-cyclopentyllithium, 1,2-dilithiomethane, 1,4-dilithiobutane, 1,4-dilithio-2-ethylcyclohexane, and 1,3,5-trilithiobenzene. n-butyllithium and sec-butyllithium are preferred among the preceding.

The lithium amide compound can be exemplified by lithium hexamethyleneimide, lithium pyrrolidide, lithium piperidide, lithium heptamethyleneimide, lithium dodecamethyleneimide, lithium morpholide, lithium dimethylamide, lithium diethylamide, lithium dibutylamide, lithium dipropylamide, lithium diisopropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithiumethylbenzylamide, lithium methylphenethylamide, 3-[N,N-bis(trimethylsilyl)]-1-propyllithium, 3-[N,N-bis(trimethylsilyl)]-2-methyl-1-propyllithium, 3-[N,N-bis(trimethylsilyl)]-2,2-dimethyl-1-propyllithium, 4-[N,N-bis(trimethylsilyl)]-1-butyllithium, 5-[N,N-bis(trimethylsilyl)]-1-pentyllithium, 8-[N,N-bis(trimethylsilyl)]-1-octyllithium, 3-(2,2,5,5-tetramethyl-2,5-disila-1-azacyclopentane)-1-propyllithium, 2-methyl-3-(2,2,5,5-tetramethyl-2,5-disila-1-azacyclopentane)-1-propyllithium, 2,2-dimethyl-3-(2,2,5,5-tetramethyl-2,5-disila-1-azacyclopentane)-1-propyllithium, 4-(2,2,5,5-tetramethyl-2,5-disila-1-azacyclopentane)-1-butyllithium, and 6-(2,2,5,5-tetramethyl-2,5-disila-1-azacyclopentane)-1-hexyllithium. Among the preceding, cyclic lithium amides such as lithium hexamethyleneimide, lithium pyrrolidide, lithium piperidide, lithium heptamethyleneimide, lithium dodecamethyleneimide, and so forth, are preferred for their polymerization initiation activity and their interaction with carbon black and silica. Among these, lithium hexamethyleneimide, lithium pyrrolidide, and lithium piperidide are particularly preferred.

These lithium amide compounds are frequently prepared by using a lithium compound and a secondary amine in advance, and are used in the polymerization, but may also be prepared in the polymerization system (in situ). The amount of use of this polymerization initiator is preferably selected from the range of 0.2 to 20 millimoles per 100 g of monomer.

In a specific method for producing a conjugated diene polymer by anionic polymerization using a lithium compound as described above as the polymerization initiator, for example, diene monomer, or, diene monomer and aromatic vinyl compound is subjected to anionic polymerization, possibly in the presence of a randomizer, in an organic solvent inert to the reaction, e.g., a hydrocarbon solvent such as an aliphatic, alicyclic, or aromatic hydrocarbon compound, using the aforementioned lithium compound as the polymerization initiator. The desired conjugated diene polymer can be obtained by using this method.

The aforementioned hydrocarbon solvent preferably has from 3 to 8 carbons, and can be exemplified by propane, n-butane, isobutane, n-pentane, isopentane, n-hexane, cyclohexane, propene, 1-butene, isobutene, trans-2-butene, cis-2- butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene, and so forth. A single one of these may be used or a mixture of two or more may be used.

The randomizer that is used on an optional basis is a compound that functions to control the microstructure of the conjugated diene polymer, for example, to increase the vinyl bonds (i.e. 1,2-bonding) in the butadiene moiety in a butadiene-styrene copolymer or increase the vinyl bonds (i.e. 1,2-bonding and 3,4-bonding) in an isoprene polymer, or to control the component distribution of the monomer units in the conjugated diene polymer, for example, to randomize the butadiene units and styrene units in a butadiene-styrene copolymer. There are no particular limitations on this randomizer, and any randomizer can be used selected as appropriate from the known compounds heretofore generally known as a randomizer. Specific examples are ethers and tertiary amines such as dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, N,N,N',N'-tetramethylethylenediamine, 1, 2-dipiperidinoethane, ethylene glycol dibutyl ether, ethylene glycol dimethyl ether, diethyl ether, dioxane, trimethylamine, quinuclidine, potassium t-amylate, potassium t-butylate, triphenylphosphine, tetrahydropyran, dibutyl ether, ethylene glycol diethyl ether, diethylene glycol diethyl ether, diphenyl ether, anisole, tripropylamine, tributylamine, N,N-diethylaniline, quinoline, and so forth. A single one of these randomizers may be used by itself or a combination of two or more may be used.

A potassium compound may be added in combination with the polymerization initiator when an increase in the reactivity of the aforementioned polymerization initiator is sought or when a random arrangement of the aromatic vinyl compound inserted into the polymer is sought or when a single unit chain/long chain of the aromatic vinyl compound is to be provided. The potassium compound added in combination with the polymerization initiator can be exemplified by potassium alkoxides as typified by potassium isopropoxide, potassium t-butoxide, potassium t-amyloxide, potassium n-heptoxide, potassium benzyloxide, and potassium phenoxide; potassium phenoxide; the potassium salt of, e.g., isovalerianic acid, caprylic acid, lauric acid, palmitic acid, stearic acid, oleic acid, linoleic acid, benzoic acid, phthalic acid, 2-ethylhexanoic acid, and so forth; the potassium salts of organosulfonic acids such as dodecylbenzenesulfonic acid, tetradecylbenzenesulfonic acid, hexadecylbenzenesulfonic acid, octadecylbenzenesulfonic acid, and so forth; and the potassium salts of organophosphite ester moieties such as diethyl phosphite, diisopropyl phosphite, diphenyl phosphite, dibutyl phosphite, dilauroyl phosphite, and so forth.

These potassium compounds are preferably added at 0.005 to 0.5 mole per 1 gram-atom equivalent of the alkali metal or alkaline-earth metal in the polymerization initiator. When this amount is less than 0.005 mole, the addition of the potassium compound has no effect in enhanced reactivity by the polymerization initiator, randomization of the aromatic vinyl compound or generation of a single unit chain/long chain of the aromatic vinyl compound. When this amount is above 0.5 mole, on the other hand, the polymerization activity is reduced and the productivity is then substantially reduced, and in combination with these, the modification efficiency in the modification reaction with the first alkoxysilane compound may be reduced.

The temperature in this polymerization reaction is preferably from −20 to 150° C. and more preferably is from 0 to 120° C. The polymerization reaction can be carried out under the spontaneously generated pressure, but as a general matter the process is preferably run at a pressure sufficient to substantially maintain the monomer in the liquid phase. Thus, the pressure will also depend on the substance(s) being polymerized, the polymerization medium used, and the polymerization temperature, and as desired a pressure that is higher than the spontaneously generated pressure can be used. Such a pressure is obtained by a suitable method, for example, by pressurizing the reactor with a gas that is inert to the polymerization reaction.

All of the starting materials supplied to this polymerization such as the polymerization initiator, solvent, monomer, and so forth, are desirably used in this polymerization after the removal of substances that can poison or inhibit the reaction such as water, oxygen, carbon dioxide, protic compounds, and so forth from the starting materials. When the obtained polymer is an elastomer, the glass-transition temperature (Tg) of the obtained polymer or copolymer, as determined by differential calorimetric analysis, is preferably −90° C. to 0° C. It is difficult to obtain a polymer that has a glass-transition temperature of less than −90° C. When the glass-transition temperature exceeds 0° C., the viscosity in the room temperature region is too high and handling can be very problematic.

The alkoxysilyl group in the first alkoxysilane compound has at least two alkoxy groups based on a consideration of the reactivity with the conjugated diene polymer having an alkali metal or alkaline-earth metal active terminal. Suitable examples of the alkoxy group are alkoxy groups that have a $C_{1-20}$ alkyl group or an aryl group. When two or more alkoxy groups are present, they may be the same as each other or they may differ from one another.

With regard to the group convertible to onium in the first alkoxysilane compound, this molecule should contain at least one group that is a protected group protected from the alkali metal or alkaline-earth metal active terminals of the conjugated diene polymer and that, after deprotection, can be converted to onium by the action of an onium generator. This group convertible to onium can be exemplified by nitrogenous groups obtained by substituting two hydrogen atoms on a primary amine with two protective groups, nitrogenous groups obtained by substituting one hydrogen atom on a secondary amine with one protective group, tertiary amino groups, imino groups, pyridyl groups, phosphorus-containing groups obtained by substituting two hydrogen atoms of a primary phosphine with two protective groups, phosphorus-containing groups obtained by substituting one hydrogen atom of a secondary phosphine with one protective group, tertiary phosphino groups, and sulfur-containing groups obtained by substituting one hydrogen atom on a thiol with one protective group. A single one of these first alkoxysilane compounds can be used by itself (i.e. singly) or two or more can be used in combination.

The following are examples of compounds that have an alkoxysilyl group and a nitrogenous group obtained by substituting two hydrogen atoms on a primary amine with two protective groups, a nitrogenous group obtained by substituting one hydrogen atom on a secondary amine with one protective group, or a tertiary amino group: N,N-bis(trimethylsilyl)aminopropylmethyldimethoxysilane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis (trimethylsilyl)aminoethylmethyldimethoxysilane, N,N-bis(trimethylsilyl)aminoethylmethyldiethoxysilane, N,N-bis(triethylsilyl)aminopropylmethyldimethoxysilane, N,N-bis(triethylsilyl)aminopropyltrimethoxysilane, N,N-bis(triethylsilyl)aminopropyltriethoxysilane, N,N-bis(triethylsilyl)aminopropylmethyldiethoxysilane, N,N-bis(triethylsilyl)aminoethyltrimethoxysilane, N,N-bis(triethylsilyl)aminoethyltriethoxysilane, N,N-bis(triethylsilyl)aminoethylmethyldimethoxysilane, N,N-bis(triethylsilyl)aminoethylmethyldiethoxysilane, N,N',N'-tris(trimethylsilyl)-N-(2-aminoethyl)-3-aminopropyltriethoxysilane, N,N',N'-tris(trimethylsilyl)-N-(2-aminoethyl)-3-aminopropylmethyldiethoxysilane, N,N',N'-tris(trimethylsilyl)-N-(2-aminoethyl)-3-aminopropyltrimethoxysilane, (trimethylsilyl)-N-(2-aminoethyl)-3-aminopropylmethyldimethoxysilane, 1-(3-triethoxysilylpropyl)-2,2,5,5-tetramethyl-1-aza-2,5-disilacyclopentane, 1-(3-trimethoxysilylpropyl)-2,2,5,5-tetramethyl-1-aza-2,5-disilacyclopentane, 1-(3-methyldiethoxysilylpropyl)-2,2,5,5-tetramethyl-1-aza-2,5-disilacyclopentane, 1-(3-methyldimethoxysilylpropyl)-2,2,5,5-tetramethyl-1-aza-2,5-disilacyclopentane, 1-trimethylsilyl-2,2-dimethoxy-1-aza-2-silacyclopentane, N-[3-(trimethoxysilyl) propyl]-N,N'-diethyl-N'-trimethylsilyl-ethane-1,2-diamine, N-[3-(triethoxysilyl)propyl]-N,N'-diethyl-N'-trimethylsilyl-ethane-1,2-diamine, N-[3-(methyldimethoxysilyl)propyl]-N,N'-diethyl-N'-trimethylsilyl-ethane-1,2-diamine, N-[3-(methyldimethoxysilyl) propyl]-N,N'-diethyl-N'-trimethylsilyl-p-phenylenediamine, N-[3-(triethoxysilyl)propyl]-N,N'-diethyl-N'-trimethylsilyl-p-phenylenediamine, 3-[3-(trimethylsilylethylamino)-1-pyrrolidinyl)propylmethyldiethoxysilane, 3-[3-(trimethylsilylpropylamino)-1-pyrrolidinyl)propyltriethoxysilane, N-(3-(diethoxymethylsilyl)propyl]-N-ethyl-N'-(2-ethoxyethyl)-N'-trimethylsilylethane-1,2-diamine, N-[3-(tripropoxysilyl)propyl]-N-propyl-N'-(2-ethoxyethyl)-N'-triethylsilyl-p-phenylenediamine, N-[2-(diethoxymethylsilyl)-1-methylethyl]-N-ethyl-N'-(2-diethylaminoethyl)-N'-triethylsilylethane-1,2-diamine, N-[3-(triethoxysilyl)propyl]-N-ethyl-N'-(2-diethylaminoethyl)-N'-triethylsilylethane-1,2-diamine, 3-(4-trimethylsilyl-1-piperazino)propylmethyldimethoxysilane, 3-(4-trimethylsilyl-1-piperazino)propyltriethoxysilane, 3-(4-trimethylsilyl-1-piperazino) propyltributoxysilane, 3-(4-trimethylsilyl-1-piperazino)propylmethyldiethoxysilane, 3-(4-trimethylsilyl-1-piperazino)propyltrimethoxysilane, 3-(3-trimethylsilyl-1-imidazolidinyl)propylethyldiethoxysilane, 3-(3-trimethylsilyl-1-imidazolidinyl)propyltriethoxysilane, 3-(3-trimethylsilyl-1-hexahydropyrimidinyl)propylmethyldimethoxysilane, 3-(3-trimethylsilyl-1-hexahydropyrimidinyl)propyltriethoxysilane, 4-(4-trimethylsilyl-1-piperazinyl)butyltriethoxysilane, N-[2-(trimethoxysilyl)ethyl]-N,N',N'-trimethylethane-1,2-diamine, N-[2-(dimethoxymethylsilyl)ethyl]-N-ethyl-N',N'-dimethylethane-1,2-diamine, N-[3-(trimethoxysilyl)propyl]-N,N',N'-trimethylpropane-1,3-diamine, N-[3-(dimethoxymethylsilyl)propyl]-N-ethyl-N',N'-dimethylpropane-1,3-diamine, N-[3-(triethoxysilyl)propyl]methylpropane-1,3-diamine, N-[3-(dimethoxymethylsilyl)propyl]-2,N,N',N'-tetramethylpropane-1,3-diamine, N-(2-dimethylaminoethyl) [2-(trimethoxysilyl)ethyl]-N,N'-dimethylethane-1,2-diamine, N-[2-(diethoxypropylsilyl)ethyl]-N'-(3-ethoxypropyl)-N,N'-dimethylethane-1,2-diamine, N-[2-(trimethoxysilyl)ethyl]-N'-methoxymethyl-N,N'-dimethylethane-1,2-diamine, N-[2-(trimethoxysilyl)ethyl]-N,N'-dimethyl-N'-(2-trimethylsilylethyl)ethane-1,2-diamine, N-[2-(triethoxysilyl)ethyl]-N,N'-diethyl-N'-(2-dibutylmethoxysilylethyl)ethane-1,2-diamine, 1-[3-(triethoxysilyl)propyl]-4-methylpiperazine, 1-[3-(diethoxyethylsilyl)propyl]-4-methylpiperazine, 1-[3-(trimethoxysilyl)propyl]-4-methylpiperazine, 1-[3-(diethoxymethylsilyl)propyl]-4-methylpiperazine, 1-[3-(dimethoxymethylsilyl)propyl]-4-methylpiperazine, 1-[3-(trimethoxysilyl)propyl]-3-methylimidazolidine, 1-[3-(diethoxyethylsilyl)propyl]-3-ethylimidazolidine, 1-[3-(triethoxysilyl)propyl]-3-methylhexahydropyrimidine, 1-[3-(dimethoxymethylsilyl)propyl]-3-methylhexahydropyrimidine, 3-[3-(tributoxysilyl)propyl]-1-methyl-1,2,3,4-tetrahydropyrimidine, 3-[3-(dimethoxymethylsilyl)propyl]-1-ethyl-1,2,3,4-tetrahydropyrimidine, 1-(2-ethoxyethyl)-3-[3-(trimethoxysilyl)propyl]imidazolidine, 2-{3-[3-(trimethoxysilyl)propyl]tetrahydropyrimidin-1-yl}ethyldimethylamine, 2-(trimethoxysilyl)-1,3-dimethylimidazolidine, 2-(diethoxyethylsilyl)-1,3-diethylimidazolidine, 2-(triethoxysilyl)-1,4-diethylpiperazine, 2-(dimethoxymethylsilyl)-1,4-dimethylpiperazine, 5-(triethoxysilyl)-1,3-dipropylhexahydropyrimidine, 5-(diethoxyethylsilyl)-1,3-diethylhexahydropyrimidine, 2-[3-(2-dimethylaminoethyl)-2-(ethyldimethoxysilyl)imidazolidin-1-yl]ethyldimethylamine, 5-(trimethoxysilyl)-1,3-bis(2-methoxyethyl)hexahydropyrimidine, 5-(ethyldimethoxysilyl)-1,3-bistrimethylsilylhexahydropyrimidine, 2-(3-diethoxyethylsilylpropyl)-1,3-diethylimidazolidine, 2-(3-triethoxysilylpropyl)-1,4-diethylpiperazine, 2-(3-dimethoxymethylsilylpropyl)-1,4-dimethylpiperazine, 5-(3-triethoxysilylpropyl)-1,3-dipropylhexahydropyrimidine, 5-(3-diethoxyethylsilylpropyl)-1,3-diethylhexahydropyrimidine, 2-[3-(2-dimethylaminoethyl)-2-(3-ethyldimethoxysilylpropyl)imidazolidin-1-yl]ethyldimethylamine, 5-(3-trimethoxysilylpropyl)-1,3-bis(2-methoxyethyl)hexahydropyrimidine, 5-(3-ethyldimethoxysilylpropyl)-1,3-bis(2-trimethylsilylethyl)hexahydropyrimidine, 3-dimethylaminopropyltrimethoxysilane, 3-diethylaminopropyltrimethoxysilane, 3-dimethylaminopropyltriethoxysilane, 3-diethylaminopropyltriethoxysilane, 3-ethylmethylaminopropyltrimethoxysilane, 3-ethylmethylaminopropyltriethoxysilane, 3-dimethylaminopropylmethyldimethoxysilane, 3-diethylaminopropylethyldimethoxysilane, 3-dimethylaminopropylethyldimethoxysilane, 3-diethylaminopropylethyldimethoxysilane, 3-dimethylaminopropyldimethylmethoxysilane, 3-dimethylaminopropyldiethylmethoxysilane, 3-diethylaminopropyldimethylmethoxysilane, 3-diethylaminopropyldiethylmethoxysilane, 3-ethylmethylaminopropylmethyldimethoxysilane, 3-methyl-3-ethylaminopropylethyldimethoxysilane, 3-dimethylaminopropylmethyldiethoxysilane, 3-diethylaminopropylmethyldiethoxysilane, 3-dimethylaminopropylethyldiethoxysilane, 3-diethylaminopropylethyldiethoxysilane, 3-dimethylaminopropyldimethylethoxysilane, 3-dimethylaminopropyldiethylethoxysilane, 3-diethylaminopropyldimethylethoxysilane, 3-diethylaminopropyldiethylethoxysilane, 3-ethylmethylaminopropylmethyldiethoxysilane, 3-ethylmethylaminopropylethyldiethoxysilane, 3-di(methoxymethyl)aminopropyltrimethoxysilane, 3-di(methoxyethyl)aminopropyltrimethoxysilane, 3-di(methoxymethyl)aminopropyltriethoxysilane, 3-di(methoxyethyl)aminopropyltrimethoxysilane, 3-di(ethoxymethyl)aminopropyltrimethoxysilane, 3-di(ethoxyethyl)aminopropyltrimethoxysilane, 3-di(ethoxymethyl)aminopropyltriethoxysilane, 3-di(ethoxymethyl)

aminopropyltriethoxysilane, 3-di(trimethylsilyl)aminopropyltrimethoxysilane, 3-di(trimethylsilyl)aminopropyltriethoxysilane, 3-di(t-butyldimethylsilyl)aminopropyltrimethoxysilane, 3-di(t-butyldimethylsilyl)aminopropyltriethoxysilane, 3-di(trimethylsilyl)aminopropylmethyldimethoxysilane, 3-di(trimethylsilyl)aminopropylmethyldiethoxysilane, 3-di(t-butyldimethylsilyl)aminopropylmethyldimethoxysilane, 3-di(t-butyldimethylsilyl)aminopropylmethyldiethoxysilane, 3-di(trimethylsilyl)aminopropyldimethylmethoxysilane, 3-di(trimethylsilyl)aminopropyldimethylethoxysilane, 3-di(t-butyldimethylsilyl)aminopropyldimethylmethoxysilane, 3-di(t-butyldimethylsilyl)aminopropyldimethylethoxysilane, 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-piperidinopropyltrimethoxysilane, 3-piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, bis[3-(triethoxysilyl)propyl]trimethylsilylamine, and bis[3-(trimethoxysilyl)propyl]trimethylsilylamine. The following are preferred: N,N-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N',N'-tris(trimethylsilyl)-N-(2-aminoethyl)-3-aminopropyltriethoxysilane, 1-trimethylsilyl-2,2-dimethoxy-1-aza-2-silacyclopentane, N-[3-(trimethoxysilyl)propyl]-N,N'-diethyl-N'-trimethylsilylethane-1,2-diamine, N-[3-(triethoxysilyl)propyl]-N,N'-diethyl-N'-trimethylsilylethane-1,2-diamine, 3-(4-trimethylsilyl-1-piperazino)propyltriethoxysilane, N-[2-(trimethoxysilyl)ethyl]-N,N',N'-trimethylethane-1,2-diamine, 1-[3-(triethoxysilyl)propyl]-4-methylpiperazine, 2-(trimethoxysilyl)-1,3-dimethylimidazolidine, 2-(3-trimethoxysilylpropyl)-1,3-dimethylimidazolidine, 3-dimethylaminopropyltrimethoxysilane, 3-diethylaminopropyltrimethoxysilane, 3-dimethylaminopropyltriethoxysilane, 3-diethylaminopropyltriethoxysilane, bis[3-(triethoxysilyl)propyl]trimethylsilylamine, and bis[3-(trimethoxysilyl)propyl]trimethylsilylamine.

Compounds that have an alkoxysilyl group and an imino group or pyridyl group can be exemplified by N-(1,3-dimethylbutylidene)-3-(triethoxysilyl)-1-propanamine, N-(1,3-methylethylidene)-3-(triethoxysilyl)-1-propanamine, N-ethylidene-3-(triethoxysilyl)-1-propanamine, N-(1-methylpropylidene)-3-(triethoxysilyl)-1-propanamine, N-(4-N,N-dimethylaminobenzylidene)-3-(triethoxysilyl)-1-propanamine, and N-(cyclohexylidene)-3-(triethoxysilyl)-1-propanamine, and the trimethoxysilyl compounds, methyldiethoxysilyl compounds, and ethyldimethoxysilyl compounds corresponding to these triethoxysilyl compounds, as well as N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane, and 3-hexamethyleneiminopropylethyldiethoxysilane. The following are preferred: N-(1,3-dimethylbutylidene)-3-(triethoxysilyl)-1-propanamine, N-(1-methylpropylidene)-3-(triethoxysilyl)-1-propanamine, and N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole.

The following are examples of compounds that have an alkoxysilyl group and a phosphorus-containing group obtained by substituting two hydrogen atoms of a primary phosphine with two protective groups, a phosphorus-containing group obtained by substituting one hydrogen atom of a secondary phosphine with one protective group, a tertiary phosphino group, or a sulfur-containing group obtained by substituting one hydrogen atom on a thiol with one protective group: P,P-bis(trimethylsilyl)phosphinopropylmethyldimethoxysilane, P,P-bis(trimethylsilyl)phosphinopropyltrimethoxysilane, P,P-bis(trimethylsilyl)phosphinopropyltriethoxysilane, P,P-bis(trimethylsilyl)phosphinopropylmethyldiethoxysilane, P,P-bis(trimethylsilyl)phosphinoethyltrimethoxysilane, P,P-bis(trimethylsilyl)phosphinoethyltriethoxysilane, P,P-bis(trimethylsilyl)phosphinoethylmethyldimethoxysilane, P,P-bis(trimethylsilyl)phosphinoethylmethyldiethoxysilane, 3-dimethylphosphinopropyltrimethoxysilane, 3-diethylphosphinopropyltrimethoxysilane, 3-dimethylphosphinopropyltriethoxysilane, 3-diethylphosphinopropyltriethoxysilane, 3-ethylmethylphosphinopropyltrimethoxysilane, 3-ethylmethylphosphinopropyltriethoxysilane, 3-dimethylphosphinopropylmethyldimethoxysilane, 3-diethylphosphinopropylmethyldimethoxysilane, 3-dimethylphosphinopropylethyldimethoxysilane, 3-diethylphosphinopropylethyldimethoxysilane, 3-dimethylphosphinopropyldimethylmethoxysilane, 3-dimethylphosphinopropyldiethylmethoxysilane, 3-diethylphosphinopropyldimethylmethoxysilane, 3-diethylphosphinopropyldiethylmethoxysilane, 3-ethylmethylphosphinopropylmethyldimethoxysilane, 3-ethylmethylphosphinopropylethyldimethoxysilane, 3-dimethylphosphinopropylmethyldiethoxysilane, 3-diethylphosphinopropylmethyldiethoxysilane, 3-dimethylphosphinopropylethyldiethoxysilane, 3-diethylphosphinopropylethyldiethoxysilane, 3-dimethylphosphinopropyldimethylethoxysilane, 3-dimethylphosphinopropyldiethylethoxysilane, 3-diethylphosphinopropyldimethylethoxysilane, 3-diethylphosphinopropyldiethylethoxysilane, 3-ethylmethylphosphinopropylmethyldiethoxysilane, 3-ethylmethylphosphinopropylethyldiethoxysilane, 3-diphenylphosphinopropyltrimethoxysilane, 3-diphenylphosphinopropyltriethoxysilane, 3-diphenylphosphinopropylmethyldimethoxysilane, 3-diphenylphosphinopropylmethyldiethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, S-trimethylsilylmercaptoethyltrimethoxysilane, S-trimethylsilylmercaptoethyltriethoxysilane, S-trimethylsilylmercaptoethylmethyldimethoxysilane, and S-trimethylsilylmercaptoethylmethyldiethoxysilane. The following are preferred: 3-diphenylphosphinopropyltrimethoxysilane, 3-diphenylphosphinopropyltriethoxysilane, S-trimethylsilylmercaptopropylmethyldimethoxysilane, S-trimethylsilylmercaptopropyltrimethoxysilane, S-trimethylsilylmercaptopropyltriethoxysilane, and S-trimethylsilylmercaptopropylmethyldiethoxysilane.

The reaction of the first alkoxysilane compound and the conjugated diene polymer having an alkali metal or alkaline-earth metal active terminal results in bonding between the alkali metal or alkaline-earth metal active terminal moiety and one moiety (i.e. one alkoxy group) of the at least two alkoxy groups, thereby producing a modified conjugated diene polymer that has the group convertible to onium and the remaining alkoxysilyl group or groups. The aforementioned first alkoxysilane compounds all have the same functionality in terms of their reactivity with the conjugated diene polymer having a metal active terminal of alkali metal or alkaline-earth metal, their reaction or interaction with the carbon black and/or silica used as a reinforcing agent when the rubber composition is formulated, and their ability to provide an excellent low hysteresis loss behavior once the crosslinked rubber composition has been produced, and those species not explored in the examples below can also be used in the present invention.

The modification reaction—in which the first alkoxysilane compound is introduced at the alkali metal or alkaline-earth metal active terminal of the conjugated diene polymer—can be run, for example, as a solution reaction. In a solution reaction, the solution may contain unreacted monomer which has been used for the polymerization. The regime for the modification reaction is not particularly limited, and the modification reaction may be run using a batch reactor or may be run in a continuous regime using equipment such as, for example, a multistage continuous reactor or an inline mixer. This modification reaction is preferably run prior to carrying out, for example, solvent removal, treatment with water, heat treatment, and operations required for isolation of the polymer and the like, and after completion of the polymerization reaction.

With regard to the amount of use of the first alkoxysilane compound in this modification reaction, the first alkoxysilane compound is added in an amount that is preferably at least 0.1 mole-equivalent and more preferably at least 0.3 mole-equivalent with reference to the active site of the conjugated diene polymer obtained by the anionic polymerization. When the amount is less than 0.1 mole-equivalent, the modification reaction will not proceed adequately and the dispersibility of the reinforcing agent will not undergo a satisfactory improvement, resulting in a deterioration for the crosslinked rubber composition in tensile strength, wear resistance, wet skid resistance, and low hysteresis loss performance.

There are no particular limitations on the method for adding the first alkoxysilane compound used as a modifying agent, and it may be added all at once or may be added in portions or may be added continuously. Among these methods, the method of addition all at once is preferred. Moreover, the first alkoxysilane compound may be added in the form of a solution in which, for example, the following is used as the solvent: the conjugated diene monomer as described in paragraph number [0011] of this Specification, the aromatic vinyl compound described in paragraph number [0012], the hydrocarbon solvent described in paragraph number [0019], or the randomizer described in paragraph number [0020].

The polymerization temperature for the conjugated diene polymer may be used without alteration as the temperature of the modification reaction. In specific terms, the range of 0 to 120° C. is preferred, and 20 to 100° C. is more preferred. The viscosity of the polymer tends to increase when a lower temperature is used, while the polymerization active terminals are prone to undergo deactivation when a higher temperature is used. Accordingly, a temperature outside the numerical range indicated above is thus disfavored. The reaction time in the primary modification reaction is preferably from 1 minute to 5 hours and more preferably is from 2 minutes to 1 hour.

A coupling agent may also be added and used in combination with the first alkoxysilane compound in the production of the conjugated diene polymer. Specific examples of this coupling agent have already been provided above. The coupling agent is added in the stage in which the conjugated diene polymer is modified by the aforementioned first alkoxysilane compound.

Thus, the coupling agent that is used in combination with the first alkoxysilane compound and that reacts with the polymerization active terminal can be exemplified by at least one compound selected from the group consisting of (a) isocyanate compounds and/or isothiocyanate compounds, (b) amide compounds and/or imide compounds, (c) pyridyl-substituted ketone compounds and/or pyridyl-substituted vinyl compounds, (d) silicon compounds, (e) ester compounds, (f) ketone compounds, (g) tin compounds, (h) epoxy compounds, (i) phosphate ester compounds, (j) compounds that contain an acid anhydride group, (k) vinyl-containing aryl compounds, and (l) compounds that contain a halogenated carbon group.

Among these compounds, favorable examples of the component (a) isocyanate compounds and isothiocyanate compounds are 2,4-tolylenediisocyanate, 2,6-tolylenediisocyanate, diphenylmethanediisocyanate, polymeric-type diphenylmethanediisocyanate (C-MDI), isophoronediisocyanate, hexamethylenediisocyanate, 1,3,5-benzenetriisocyanate, and phenyl-1,4-diisothiocyanate.

Favorable examples of the component (b) amide compounds and imide compounds are amide compounds such as succinamide, phthalamide, N,N,N',N'-tetramethylphthalamide, oxamide, and N,N,N',N'-tetramethyloxamide and imide compounds such as succinimide, N-methylsuccinimide, maleimide, N-methylmaleimide, phthalimide, and N-methylphthalimide.

Favorable examples of the component (c) pyridyl-substituted ketone compounds and pyridyl-substituted vinyl compounds are dibenzoylpyridine, diacetylpyridine, and divinylpyridine.

Favorable examples of the component (d) silicon compounds are dibutyldichlorosilane, methyltrichlorosilane, methyldichlorosilane, tetrachlorosilane, triethoxymethylsilane, triphenoxymethylsilane, trimethoxysilane, methyltriethoxysilane, 4,5-epoxyheptylmethyldimethoxysilane, and bis(triethoxysilylpropyl)tetrasulfide.

Favorable examples of the component (e) ester compounds are diethyl adipate, diethyl malonate, diethyl phthalate, diethyl glutarate, and diethyl maleate.

Favorable specific examples of the component (f) ketone compounds are N,N,N',N'-tetramethyl-4,4'-diaminobenzophenone, N,N,N',N'-tetraethyl-4,4'-diaminobenzophenone, N,N-dimethyl-1-aminobenzoquinone, N, N, N',N'-tetramethyl-1,3-diaminobenzoquinone, N,N-dimethyl-1-aminoanthraquinone, and N,N,N',N'-tetramethyl-1,4-diaminoanthraquinone Favorable examples of the component (g) tin compounds are tetrachlorotin, tetrabromotin, trichlorobutyltin, trichloromethyltin, trichlorooctyltin, dibromodimethyltin, dichlorodimethyltin, dichlorodibutyltin, dichlorodioctyltin, 1,2-bis(trichlorostannyl)ethane, 1,2-bis(methyldichlorostannyl)ethane, 1,4-bis(trichlorostannyl)butane, 1,4-bis(methyldichlorostannyl)butane, ethyltin tristearate, butyltin trisoctanoate, butyltin tristearate, butyltin trislaurate, dibutyltin bisoctanoate, dibutyltin bisstearate, and dibutyltin bislaurate.

Favorable examples of the component (h) epoxy compounds are the polyglycidyl ethers of polyhydric alcohols, e.g., ethylene glycol diglycidyl ether and glycerol triglycidyl ether; the polyglycidyl ethers of aromatic compounds that have at least two phenyl groups, e.g., diglycidylated bisphenol A; polyepoxy compounds such as 1,4-diglycidylbenzene, 1,3,5-triglycidylbenzene, and polyepoxidized liquid polybutadiene; epoxy group-containing tertiary amines such as 4,4'-diglycidyldiphenylmethylamine and 4,4'-diglycidyldibenzylmethylamine; glycidylamino compounds such as diglycidylaniline, diglycidyl orthotoluidine, tetraglycidyl metaxylenediamine, tetraglycidylaminodiphenylmethane, tetraglycidyl-p-phenylenediamine, diglycidylaminomethylcyclohexane, and tetraglycidyl-1,3-bisaminomethylcyclohexane; and compounds that contain the epoxy group and another functional group, e.g., 3-glycidoxypropyltrimethoxysilane, 3-glycidoxypropyltriethoxysilane, 3-glycidoxypropyltributoxysilane, epoxy-modified silicones, epoxidized soy oil, and epoxidized linseed oil.

Favorable examples of the component (i) phosphate ester compounds are polyhalogenated phosphorus compounds such as trichlorophosphine and tribromophosphine; phosphite ester compounds such as trisnonylphenyl phosphite, trimethyl phosphite, and triethyl phosphite; as well as trimethyl phosphate and triethyl phosphate.

Favorable examples of the component (j) acid anhydride group-compounds are pyromellitic anhydride and styrene-maleic anhydride copolymers.

Favorable examples of the component (k) vinyl-containing aryl compounds are divinylbenzene, diisopropenylbenzene, and divinylbenzene oligomers.

Favorable examples of the component (l) compounds that contain a halogenated carbon group are trichloropropane, tribromopropane, and tetrachlorobutane.

A single one of these compounds for co-use with the first alkoxysilane compound and reactive with the polymerization active terminal may be used by itself or two or more may be used in combination.

The coupling agent is used in an amount of not more than 1 mole, and preferably of from 0.1 to 0.5 mole, as the amount of coupleable substituent in the coupling agent per 1 gram-atom equivalent of the alkali metal or alkaline-earth metal in the polymerization initiator. When the amount is more than 1 mole, the conversion of the first alkoxysilane compound declines and, for example, an excellent low hysteresis loss behavior is not obtained for the crosslinked rubber composition.

[Step (b)]

Step (b) is a step of mixing the modified conjugated diene polymer obtained in step (a) with the onium generator and a second alkoxysilane compound having in a molecule at least one alkoxysilyl group and at least one group convertible to onium by the onium generator.

Any of the following three embodiments can be used for step (b).

The First Embodiment

This encompasses a step (b-1) of mixing the modified conjugated diene polymer obtained in step (a) with the second alkoxysilane compound that has in a molecule at least one alkoxysilyl group and at least one group convertible to onium by an onium generator and a step (b-2) of mixing the mixture obtained in step (b-1) with an onium generator.

The Second Embodiment

This encompasses a step (b-3) of mixing the modified conjugated diene polymer obtained in step (a) with an onium generator and a step (b-4) of mixing the mixture obtained in step (b-3) with the second alkoxysilane compound that has in a molecule at least one alkoxysilyl group and at least one group convertible to onium by an onium generator.

The Third Embodiment

This encompasses a step (b-5) in which the modified conjugated diene copolymer obtained in step (a), the onium generator, and the second alkoxysilane compound that has in a molecule at least one alkoxysilyl group and at least one group convertible to onium by an onium generator, are intermixed all at the same time.

Each of the components used in step (b) will now be described.

The alkoxysilyl group in the second alkoxysilane compound can be exemplified by the same alkoxysilyl groups as in the first alkoxysilane compound.

The second alkoxysilane compound contains at least one alkoxysilyl group, but, viewed from the perspective of the reaction efficiency, preferably has two or three and more preferably has three.

The group convertible to onium in the second alkoxysilane compound can be exemplified by primary amino groups, secondary amino groups, tertiary amino groups, imino groups, pyridyl groups, primary phosphino groups, secondary phosphino groups, tertiary phosphino groups, and thiol groups. A single second alkoxysilane compound can be used by itself or two or more can be used in combination.

The compound having an alkoxysilyl group and having a primary amino group, secondary amino group, tertiary amino group, imino group, pyridyl group, primary phosphino group, secondary phosphino group, tertiary phosphino group, or thiol group can be exemplified by the first alkoxysilane compounds provided above as examples in connection with step (a), but can also be exemplified by 3-aminopropyltrimethoxysilane, 3-aminopropyltriethoxysilane, 3-mercaptomethyltrimethoxysilane, 3-mercaptomethyltriethoxysilane, 3-mercaptopropyltrimethoxysilane, 3-mercaptopropyltriethoxysilane, aminophenyltrimethoxysilane, aminophenyltriethoxysilane, 3-(N-methylamino)propyltrimethoxysilane, 3-(N-methylamino)propyltriethoxysilane, N-(2-aminoethyl)-3-aminopropyltrimethoxysilane, 2-(6-aminohexyl)aminopropyltrimethoxysilane, the mercaptosilane compounds provided as examples in Japanese Patent Application Laid-open No. 2006-249069, 3-glycidoxypropyltrimethoxysilane, 3-glycidoxypropyltriethoxysilane, 3-glycidoxypropyltributoxysilane, epoxy-modified silicones, 2-(3,4-epoxycyclohexyl)ethyltrimethoxysilane, 3-glycidoxypropylmethyldiethoxysilane, 3-isocyanatopropyltriethoxysilane, 3-isocyanatopropyltrimethoxysilane, and 3-isocyanatopropylmethyldiethoxysilane.

The second alkoxysilane compound and the other components (for example, the modified conjugated diene polymer obtained in step (a)) can be mixed, for example, in solution form. There are no particular limitations on the mixing regime, and mixing may be performed using a batch mixer or may be carried out continuously using a device such as, for example, a multistage continuous mixer or an inline mixer. This mixing reaction is preferably run prior to carrying out solvent removal, treatment with water, heat treatment, operations required for isolation of the polymer and the like, and after completion of the polymerization reaction.

The amount of use of the second alkoxysilane compound in this mixing step is preferably at least 0.2 mole-equivalent and more preferably at least 0.3 mole-equivalent with reference to the active site of the conjugated diene polymer produced by the anionic polymerization. When the amount is less than 0.2 mole-equivalent, the incorporation of the second alkoxysilane compound with accompanying onium generation will be inadequate and the dispersibility of the reinforcing agent will not undergo a satisfactory improvement, resulting in a deterioration for the crosslinked rubber composition in tensile strength, wear resistance, wet skid resistance, and low hysteresis loss performance. The second alkoxysilane compound can also be used together with the first alkoxysilane compound. In this case, the first alkoxysilane compound should be used in an amount that is at least 1.2 mole-equivalents with reference to the active site of the conjugated diene polymer produced by the anionic polymerization.

There are no particular limitations on the method for adding the second alkoxysilane compound used as a modifying agent, and it may be added all at once or may be added in portions or may be added continuously, wherein addition all at once is preferred. Moreover, the second alkoxysilane compound may be added in the form of a solution in which, for example, the hydrocarbon solvent described in paragraph number [0019] of this Specification or the randomizer described in paragraph number [0020] of this Specification is the solvent.

The polymerization temperature for the conjugated diene polymer may be used without alteration for the temperature during mixing of the second alkoxysilane compound and the other components (for example, the modified conjugated diene polymer obtained in step (a)). In specific terms, the range of 0 to 120° C. is preferred and 20 to 100° C. is more preferred. The viscosity of the polymer tends to increase when a lower temperature is used, while the polymerization active terminals are prone to undergo deactivation when the temperature is higher, and a temperature outside the numerical range indicated above is thus disfavored. The mixing time is preferably from 1 minute to 5 hours and more preferably is from 2 minutes to 1 hour.

The onium generator can be exemplified by metal halides such as silicon halide compounds, tin halide compounds, aluminum halide compounds, titanium halide compounds, zirconium halide compounds, germanium halide compounds, gallium halide compounds, zinc halide compounds, and so forth; inorganic acid esters such as sulfate esters, phosphate esters, carbonate esters, nitrate esters, and so forth; inorganic acids such as hydrofluoric acid, hydrochloric acid, hydrobromic acid, hydroiodic acid, sulfuric acid, nitric acid, carbonic acid, phosphoric acid, and so forth; inorganic acid salts such as potassium fluoride, tetramethylammonium fluoride, tetra-n-butylammonium fluoride, and so forth; and organic acids such as carbonic acid, sulfonic acid, and so forth. The following are more preferred from the standpoints of ease of acquisition and ease of handling: silicon halide compounds, tin halide compounds, aluminum halide compounds, titanium halide compounds, zirconium halide compounds, germanium halide compounds, gallium halide compounds, zinc halide compounds, sulfate esters, phosphate esters, carbonic acid, and sulfonic acid.

The onium generator compound can be exemplified by silicon tetrachloride, tin tetrachloride, trimethylsilyl chloride, dimethyldichlorosilane, methyltrichlorosilane, methyldichlorosilane, diethylaluminum chloride, ethylaluminum sesquichloride, ethylaluminum dichloride, zinc chloride, titanium tetrachloride, titanocene dichloride, zirconium tetrachloride, zirconocene dichloride, germanium tetrachloride, gallium trichloride, diethyl sulfate, dimethyl sulfate, magnesium laureth sulfate, trimethyl phosphate, triethyl phosphate, tributyl phosphate, 2-ethylhexyl phosphate, triphenyl phosphate, tricresyl phosphate, dimethyl carbonate, diethyl carbonate, ethylene carbonate, propylene carbonate, nitrocellulose, nitroglycerin, nitroglycol, formic acid, acetic acid, oxalic acid, maleic acid, citric acid, malic acid, fumaric acid, malonic acid, acrylic acid, crotonic acid, succinic acid, glutaric acid, itaconic acid, tartaric acid, sebacic acid, terephthalic acid, isophthalic acid, p-mercaptopropionic acid, benzenesulfonic acid, p-toluenesulfonic acid, hydrofluoric acid, hydrochloric acid, hydrobromic acid, hydroiodic acid, sulfuric acid, nitric acid, carbonic acid, phosphoric acid, potassium fluoride, tetramethylammonium fluoride, and tetra-n-butylammonium fluoride.

These onium generators all have the same functionality in terms of being able to generate onium from the group convertible to onium, and those species not explored in the examples below can also be used in the present invention.

The onium generator can be mixed with the other components (for example, the mixture of the modified conjugated diene polymer obtained in step (a) with the second alkoxysilane compound), for example, in the form of a solution. The mixing regime is not particularly limited, and mixing may be carried out using a batch mixer or may be carried out in a continuous regime using equipment such as, for example, a multistage continuous mixer or an inline mixer.

The onium generator is used in an amount that is preferably at least 0.5 mol-equivalent and more preferably at least 1.0 mol-equivalent with reference to the active site of the conjugated diene polymer obtained by the anionic polymerization. When the amount is less than 0.5 mole-equivalent, onium generation does not proceed adequately and the shape retention behavior of the rubber may deteriorate.

There are no particular limitations on the method for adding the onium generator, and it may be added all at once or may be added in portions or may be added continuously. Among these methods, the method of addition all at once is preferred. Moreover, the onium generator may be added in the form of a solution in which, for example, the hydrocarbon solvent described in paragraph number [0019] of this Specification or the randomizer described in paragraph number [0020] of this Specification is the solvent.

The polymerization temperature for the conjugated diene polymer may be used without alteration for the temperature during mixing of the onium generator and the other components (for example, the mixture of the modified conjugated diene polymer obtained in step (a) with the second alkoxysilane compound). In specific terms, the range of 0 to 120° C. is preferred and 20 to 100° C. is more preferred. The viscosity of the polymer tends to increase when a lower temperature is used, while the polymerization active terminals are prone to undergo deactivation when the temperature is higher, and a temperature outside the numerical range indicated above is thus disfavored. The mixing time is preferably from 1 minute to 5 hours and more preferably is from 2 minutes to 1 hour.

In the method of the present invention for producing a modified conjugated diene rubber, the addition of the onium generator can be followed by recovery of the modified conjugated diene polymer by a solvent removal (for example, steam stripping) and drying operation known for the production of conjugated diene polymers.

There are no particular limitations on the method of forming an onium structure by contact between water and the onium generator, and, for example, the following methods are preferred: (i) a method in which water is added directly to the polymer solution after step (b) and mixing is performed; (ii) a method in which a solution is prepared by dissolving water in an organic solvent that is soluble in both organic solvent and water, e.g., an alcohol, and this solution is added to the polymer solution after step (b) and mixing is performed; and (iii) a method in which, after step (b), the water is mixed with the polymer solution and/or the polymer at the same time as solvent removal by a steam stripping step. Among these methods, method (iii)—in which after step (b) the water is mixed with the polymer solution and/or the polymer at the same time as solvent removal by a steam stripping step—is particularly preferred from the standpoint of efficient onium structure formation.

The reaction temperature is preferably 30 to 150° C. and more preferably is 80 to 120° C.

The modified conjugated diene polymer used in this step make take the form of the polymer solution yielded by production of the modified conjugated diene polymer and used as such without solvent removal. Alternatively, this polymer solution may be subjected to solvent removal by, for example, steam stripping, and the conjugated diene polymer obtained by additional drying may then be redissolved in a solvent, e.g., cyclohexane, and this may be used.

[2] The Modified Conjugated Diene Rubber

The modified conjugated diene rubber of this embodiment is the modified conjugated diene rubber obtained by the modified conjugated diene rubber production method described above. This modified conjugated diene rubber has a high Mooney viscosity, an excellent shape stability, and an excellent processability. The Mooney viscosity (ML1+4, 100° C.) of the modified conjugated diene rubber of this embodiment is preferably 30 to 150 and more preferably is 40 to 120. The shape stability tends to decline when the Mooney viscosity (ML1+4, 100° C.) is less than 30. When, on the other hand, the Mooney viscosity (ML1+4, 100° C.) exceeds 150, the processability is poor and mixing/kneading with compounding ingredients becomes very problematic. When the Mooney viscosity is too high, it may be brought into the indicated range by oil extension with an ordinary extender oil. An aromatic oil, naphthenic oil, paraffinic oil, or aromatic-substitute oil having a PCA no greater than 3 mass % by the IP346 method is preferably used for the extender oil. The amount of use of the extender oil may be freely selected, but typically is 10 to 50 mass parts (i.e. parts by weight) per 100 mass parts of the modified conjugated diene rubber. When an extender oil is used, it is often used in an amount of incorporation generally of 20 to 37.5 mass parts. In addition, using classification based on the oil production process, T-DAE (Treated Distillate Aromatic Extract) oil, T-RAE (Treated Residual Aromatic Extract) oil, MES (Mild Extract Solvate) oil, and RAE (Residual Aromatic Extract) oil are suitably used.

[3] The Rubber Composition

In one embodiment of the rubber composition of the present invention, the previously described modified conjugated diene polymer is incorporated as a rubber component. The details of this are described below.

[3-1] The Rubber Component

The modified conjugated diene rubber incorporated in the rubber composition of this embodiment contains the previously described modified conjugated diene polymer. The percentage content of the modified conjugated diene polymer in the modified conjugated diene rubber is preferably at least 20 mass %, more preferably at least 30 mass %, and particularly preferably at least 40 mass %. A percentage content of at least 20 mass % can provide even better mechanical properties for the crosslinked rubber composition, e.g., tensile strength and tensile elongation, and an even better crack growth resistance and wear resistance.

The modified conjugated diene rubber may contain a single species of modified conjugated diene polymer or may contain two or more species of modified conjugated diene polymers. In addition, a rubber component other than the modified conjugated diene polymer may also be present in the modified conjugated diene rubber. This other rubber component can be exemplified by natural rubber, synthetic isoprene rubber, butadiene rubber, modified butadiene rubber, styrene-butadiene rubber, modified styrene-butadiene rubber, ethylene-α-olefin copolymer rubber, ethylene-α-olefin-diene copolymer rubber, acrylonitrile-butadiene copolymer rubber, chloroprene rubber, halogenated butyl rubber, styrene-isoprene copolymer rubber, butadiene-isoprene copolymer rubber, random styrene-butadiene-isoprene copolymer rubber, styrene-acrylonitrile-butadiene copolymer rubber, acrylonitrile-butadiene copolymer rubber, polystyrene-polybutadiene-polystyrene block copolymer, and mixtures of the preceding. A crosslinked rubber having an excellent low hysteresis loss behavior can be produced when another rubber component known to be usable for rubber compositions for tire applications is also incorporated.

[3-2] Other Components (Carbon Black, Silica)

The rubber composition of this embodiment preferably also contains carbon black and/or silica. The carbon black can be specifically exemplified by various grades of carbon black such as furnace blacks as typified by SRF, GPF, FEF, HAF, ISAF, SAF, ISAF-HS, ISAF-LS, IISAF-HS, HAF-HS, and HAF-LS; acetylene blacks; thermal blacks; channel blacks; graphite; graphite fiber; fullerenes, and so forth. A carbon black having an iodine absorption (IA) of at least 60 mg/g and a dibutyl phthalate (DBP) absorption of at least 80 mL/100 g is preferred. The use of carbon black provides a large improvement in the grip performance and resistance to failure of the crosslinked rubber composition. HAF, ISAF, and SAF, which provide an excellent wear resistance, are particularly preferred. A single carbon black can be used or two or more carbon blacks may be used in combination.

The silica can be specifically exemplified by wet-method silica (hydrated silicic acid), dry-method silica (anhydrous silicic acid), colloidal silica, precipitated silica, calcium silicate, and aluminum silicate. Among these, wet-method silicas are preferred because they provide the most significant improvement in the resistance to failure and the best balance between the wet grip behavior and the low rolling resistance performance. In addition, the use of a high dispersible-type silica is also preferred from the standpoint of providing a good dispersibility in the rubber and from the standpoint of the properties and processability. A single silica can be used or two or more silicas can be used in combination.

The rubber composition of this embodiment preferably contains from 20 to 130 mass parts carbon black and/or silica per 100 mass parts of the rubber component (the sum of the modified conjugated diene rubber and the other rubber component or components), wherein 25 to 110 mass parts is even more preferred when viewed from the perspective of the improvement in the reinforcing performance and the improvement in various properties thereby generated. At a low percentage content for the carbon black and/or silica, the improvement in the, for example, resistance to failure, will tend to be inadequate. At a large percentage content for the carbon black and/or silica, the processability of the rubber composition will tend to be reduced. For these reasons the percentage content is preferably within the previously indicated numerical range. The incorporation of a carbon-silica dual phase filler in the copolymer rubber of the present invention makes it possible to obtain the same favorable advantages as for the co-use of carbon black with silica. Carbon-silica dual phase filler is a so-called silica-coated carbon black in which silica is chemically bonded on the carbon black surface and is commercially available under the CRX2000, CRX2002, and CRX2006 product names from the Cabot Corporation. The amount of incorporation of carbon-silica dual phase filler is preferably from 1 to 100 mass parts and more preferably from 5 to 95 mass parts, in each case per 100 mass parts for the total rubber component.

When silica is incorporated as a reinforcing agent in the rubber composition of this embodiment, a silane coupling agent is preferably also incorporated in order to bring about additional improvements in the reinforcing effect. This silane coupling agent can be exemplified by bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, dimethoxymethylsilylpropyl-benzothiazolyltetrasulfide, and the mercaptosilane compounds provided as examples in Japanese Patent Application Laid-open No. 2006-249069.

Commercially available products can be exemplified by the products "NXT Silane", "NXT Z Silane", "NXT-Low-V Silane", and "NXT Ultra Low-V Silane" from Momentive Performance Materials Inc.; the product "VP Si363" from Degussa; and the product "11-MERCAPTOUNDECYLTRIMETHOXYSILANE" from Gelest, Inc.

The following are preferred among the preceding from the standpoint of the improvement in the reinforcing performance: bis(3-triethoxysilylpropyl)polysulfide, 3-trimethoxysilylpropylbenzothiazyltetrasulfide, and the mercaptosilane compounds provided as examples in Japanese Patent Application Laid-open No. 2006-249069. A single one of these silane coupling agents can be used or two or more can be used in combination. The amount of silane coupling agent incorporation varies as a function of, for example, the type of silane coupling agent, but is preferably 1 to 20 mass parts and more preferably is 3 to 15 mass parts, in each case per 100 mass parts of the silica. When the amount is less than 1 mass part, it tends to be difficult for the effects as a coupling agent to be adequately manifested. When, on the other hand, when the amount is more than 20 mass parts, the rubber component then tends to be prone to gelation.

There are no particular limitations on the compounding ingredients for the rubber composition of the present invention. A compatibilizer may also be added during mixing/kneading in order to improve the processability during mixing/kneading or in order to bring about additional improvements in balance among the wet skid resistance, low hysteresis loss behavior, and wear resistance. Preferred compatibilizers are organic compounds selected from epoxy group-containing compounds, carboxylic acid compounds, carboxylate ester compounds, ketone compounds, ether compounds, aldehyde compounds, hydroxyl group-containing compounds, and amino group-containing compounds, or are silicone compounds selected from alkoxysilane compounds, siloxane compounds, and aminosilane compounds. The following compounds are specific examples of the organic compound compatibilizers.

epoxy group-containing compounds: butyl glycidyl ether, diglycidyl ether, propylene oxide, neopentyl glycol diglycidyl ether, epoxy resins, epoxidized soy oil, and epoxidized aliphatic acid esters.

carboxylic acid compounds: adipic acid, octylic acid, and methacrylic acid.

carboxylate ester compounds: acrylate esters, diethylene acrylate, ethyl methacrylate, orthoacetate esters, ethyl acetoacetate, butyl acetate, isopropyl acetate, dimethyl carbonate, p-hydroxyphenyl acetate, polyester-type plasticizers, and stearic acid-type plasticizers.

ketone compounds: methylcyclohexanone and acetylacetone.

ether compounds: isopropyl ether and dibutyl ether.

aldehyde compounds: undecylene aldehyde, decyl aldehyde, vanillin, 3,4-dimethoxybenzaldehyde, and cuminaldehyde.

amino group-containing compounds: isopropylamine, diisopropylamine, triethylamine, 3-ethoxypropylamine, 2-ethylhexylamine, isopropanolamine, N-ethylethylenediamine, ethyleneimine, hexamethylenediamine, 3-lauryloxypropylamine, aminophenol, aniline, 3-isopropoxyaniline, phenylenediamine, aminopyridine, N-methyldiethanolamine, N-methylethanolamine, 3-amino-1-propanol, ethylamine hydrochloride, and n-butylamine hydrochloride.

hydroxyl group-containing compounds: isopropyl alcohol, butanol, octanol, octanediol, ethylene glycol, methylcyclohexanol, 2-mercaptoethanol, 3-methyl-3-methoxy-1-butanol, 3-methyl-1,5-pentanediol, 1-octadecanol, diethylene glycol, butylene glycol, dibutylene glycol, and triethylene glycol.

Epoxy group-containing compounds, amino group-containing compounds, and hydroxyl group-containing compounds are preferred among the preceding.

The following compounds are specific examples of the silicone compound compatibilizers.

alkoxysilane compounds: trimethylmethoxysilane, trimethylethoxysilane, dimethyldimethoxysilane, methyltriethoxysilane, methyltriphenoxysilane, tetraethoxysilane, methyldiethoxysilane, and vinyltrimethoxysilane.

siloxane compounds: dimethylsiloxane oligomer, silicone oil, amino-modified silicone oil, epoxy-modified silicone oil, carboxyl-modified silicone oil, polyether-modified silicone oil, alkyl-modified silicone oil, higher aliphatic acid ester-modified silicone oil, higher alkoxy-modified silicone oil, and higher aliphatic acid-containing silicone oil.

aminosilane compounds: hexamethyldisilazane, nonamethyltrisilazane, anilinotrimethylsilane, bis(dimethylamino)dimethylsilane, bis(diethylamino)dimethylsilane, and triethylaminosilane. Silazane compounds and bis(dimethylamino)dimethylsilane are preferred among the preceding.

Various chemicals and additives ordinarily used in the rubber industry may be added on an optional basis to the rubber composition of this embodiment within a range that does not impair the objects of the present invention. The chemicals and additives that can be added to the rubber composition of this embodiment can be exemplified by crosslinking agents (for example, vulcanizing agents), vulcanization aids, processing aids, vulcanization accelerators, process oils, ageing inhibitors (i.e. antioxidants), scorch inhibitors, zinc white, stearic acid, and so forth.

The vulcanizing agent can be exemplified by sulfur, sulfur halides, organoperoxides, quinonedioximes, organic polyvalent amine compounds, and methylol group-containing alkylphenol resins.

Sulfur is generally used among these vulcanizing agents. It is used at preferably from 0.1 to 5 mass parts and more preferably from 0.5 to 3 mass parts per 100 mass parts of the modified conjugated diene rubber (starting rubber; rubber components). Stearic acid is generally used as a vulcanization aid and processing aid. The amount of use for the vulcanization aid and processing aid is generally from 0.5 to 5 mass parts per 100 mass parts of the modified conjugated diene rubber.

There are no particular limitations on the vulcanization accelerator, and the vulcanization accelerator can be exemplified by sulfenamide-type compounds, guanidine-type compounds, thiuram-type compounds, thiourea-type compounds, thiazole-type compounds, dithiocarbamate-type compounds, and xanthic acid-type compounds. Preferred examples of the vulcanization accelerator are 2-mercaptobenzothiazole, dibenzothiazyldisulfide, N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, N,N'-diisopropyl-2-benzothiazolesulfenamide, diphenylguanidine, diorthotolylguanidine, and orthotolylbisguanidine. The vulcanization accelerator is used generally at from 0.1 to 5 mass parts and preferably at from 0.4 to 4 mass parts per 100 mass parts of the modified conjugated diene rubber.

The rubber composition of the present invention can be produced by mixing (i.e. kneading) using a mixer (i.e. kneader), e.g., an open mixer (or open kneader), most prominently a roll, or a closed mixer (or closed kneader), most prominently a Banbury mixer. In addition, the rubber composition of the present invention can be used for various rubber products by inducing its crosslinking (vulcanization) after a molding process. The crosslinked rubber composition (the rubber composition after crosslinking) of this embodiment is well adapted for use in tire applications as, for example, a tire tread, undertread, carcass, sidewall, bead, and so forth, and is well adapted for application as a vibration-damping rubber, marine fender material, belt, hose, and other industrial products. The crosslinked rubber composition of this embodiment is particularly well adapted for use as a tire tread rubber.

The properties of the modified conjugated diene polymer (yielded by step (a)), the modified conjugated diene rubber (yielded by step (b)), the rubber composition, and the crosslinked rubber composition in the present invention are as follows.

Viewed from the perspective of maintaining a balance between the shape stability of the modified conjugated diene rubber and the processability during production of the rubber composition, the conjugated diene polymer, prior to modification, has a weight-average molecular weight as polystyrene and determined by gel permeation chromatography (GPC) of preferably 10,000 to 1,500,000, more preferably 50,000 to 1,000,000, and particularly preferably 100,000 to 800,000.

Viewed from the perspective of maintaining a balance between the low hysteresis loss behavior of the resulting crosslinked rubber composition and its wet skid resistance, the glass-transition temperature of the modified conjugated diene rubber is preferably less than or equal to 0° C., more preferably less than or equal to −5° C., and particularly preferably less than or equal to −10° C.

Viewed from the perspective of maintaining a balance between the shape stability of the modified conjugated diene rubber and the processability during production of the rubber composition, the Mooney viscosity (ML1+4, 100° C.) of the modified conjugated diene rubber is preferably from 30 to 150 and more preferably is from 40 to 120.

Viewed from the perspective of the shape stability of the modified conjugated diene rubber, the cold flow value (mg/minute) of the modified conjugated diene rubber is preferably not more than 1.5, more preferably not more than 1.0, and particularly preferably not more than 0.5.

Viewed from the perspective of the processability during tire fabrication, the Mooney viscosity (ML1+4, 100° C.) of the rubber composition is preferably from 20 to 150, more preferably from 30 to 130, and particularly preferably from 40 to 110.

The tensile strength (JIS K 6301, 300% modulus) index for the crosslinked rubber is preferably at least 100 and more preferably is at least 103.

The index for tan δ at 0° C. of the crosslinked rubber is preferably at least 125 and more preferably is at least 130.

The index for tan δ at 70° C. of the crosslinked rubber is preferably at least 130 and more preferably is at least 135.

The wear resistance (JIS K 6264, 10 N load, 25° C.) index for the crosslinked rubber is preferably at least 105, more preferably at least 107, and particularly preferably at least 109.

EXAMPLES

The present invention is specifically described below based on examples, but the present invention is not limited to these examples. In the examples and comparative examples, "parts" and "%" are on a mass basis (i.e. weight basis) unless specifically stated otherwise. The following methods were used to measure the various property values.

[bonded styrene content (%)]: determined by $^1$H-NMR at 500 MHz

[vinyl content (%)]: determined by $^1$H-NMR at 500 MHz

[glass-transition temperature (° C.)]: measured according to ASTM D 3418

[pre-modification molecular weight]: This was determined as polystyrene from the retention time corresponding to the top of the maximum peak in the GPC curve obtained by gel permeation chromatography (GPC) (HLC-8120GPC (product name (from Tosoh Corporation))).

(GPC Conditions)
    column: 2×"GMHHXL" (product name, from Tosoh Corporation)
    column temperature: 40° C.
    mobile phase: tetrahydrofuran
    flow rate: 1.0 mL/minute
    sample concentration: 10 mg/20 mL

[Mooney viscosity (ML1+4, 100° C.)]: This was determined based on JIS K 6300 using an L rotor and the following conditions: preheating for 1 minute, rotor running time=4 minutes, temperature=100° C.

[cold flow value]: The copolymer was held at a temperature of 50° C. and was extruded from a 6.35 mm orifice at a pressure condition of 24.1 kPa. At 10 minutes from the start of extrusion (after the extrusion rate had become constant), the amount (mg) of copolymer extrusion was measured every 30 minutes for 90 minutes. The average value was taken to be the cold flow value (mg/minute). A larger numerical value indicates a poorer shape stability by the rubber and more difficult handling.

Example 1

Synthesis and Evaluation of Modified Conjugated Diene Rubber A 2,750 g of cyclohexane, 50.0 g of tetrahydrofuran, 125 g of styrene, and 365 g of 1,3-butadiene were charged to a 5 L autoclave reactor that had been substituted with nitrogen. The temperature of the reactor contents was adjusted to 10° C. followed by the addition of a cyclohexane solution containing n-butyllithium (5.80 mmol) to initiate polymerization. The polymerization was run adiabatically and a maximum temperature of 85° C. was reached.

When the polymerization conversion had reached 99%, a supplemental addition of 10 g of butadiene was made and polymerization was run for an additional 5 minutes, after which 10 g of the polymer solution was sampled out in order to perform the measurement of the molecular weight pre-modification. A cyclohexane solution containing N,N-bis(triethylsilyl)aminopropylmethyldimethoxysilane (4.96 mmol) was added and a reaction was run for 15 minutes. After this reaction, a cyclohexane solution containing 3-aminopropyltriethoxysilane (4.96 mmol) was added to the polymer solution; mixing was performed for 5 minutes; a cyclohexane solution containing silicon tetrachloride (3.93 mmol) was thereafter added; and mixing was subsequently performed for 5 minutes. 2.0 g of 2,6-di-tert-butyl-p-cresol was then added to the resulting polymer solution. This was followed by solvent removal by steam stripping using hot water adjusted to pH=9 with sodium hydroxide. The rubber was dried on a hot roll thermostatted to 110° C. to yield modified conjugated diene rubber A.

The polymerization recipe for modified conjugated diene rubber A is given in Table 1, while the properties of the obtained modified conjugated diene rubber A are given in Table 2. Using the modified conjugated diene rubber A, a rubber composition was prepared in accordance with the compounding recipe given in Table 3 and was vulcanized and property evaluation was performed. The results are shown in Table 4.

Example 2

Synthesis and Evaluation of Modified Conjugated Diene Rubber B

A modified conjugated diene rubber B was obtained using the same method as in Example 1, but in this case using N,N',N'-tris(trimethylsilyl)-N-(2-aminoethyl)-3-aminopropyltriethoxysilane in place of the N,N-bis(triethylsilyl)aminopropylmethyldimethoxysilane used in Example 1 and changing the 3.93 mmol amount of silicon tetrachloride addition used in Example 1 to 5.17 mmol.

The polymerization recipe for modified conjugated diene rubber B is given in Table 1, while the properties of the obtained modified conjugated diene rubber B are given in Table 2. Using the modified conjugated diene rubber B, a rubber composition was prepared in accordance with the compounding recipe given in Table 3 and was vulcanized and property evaluation was performed. The results are shown in Table 4.

Example 3

Synthesis and Evaluation of Modified Conjugated Diene Rubber C 2,750 g of cyclohexane, 10.3 g of tetrahydrofuran, 50 g of styrene, and 440 g of 1,3-butadiene were charged to a 5 L autoclave reactor that had been substituted with nitrogen. The temperature of the reactor contents was adjusted to 10° C. followed by the addition of a cyclohexane solution containing n-butyllithium (5.80 mmol) to initiate polymerization. The polymerization was run adiabatically and a maximum temperature of 90° C. was reached.

When the polymerization conversion had reached 99%, a supplemental addition of 10 g of butadiene was made and polymerization was run for an additional 5 minutes, after which 10 g of the polymer solution was sampled out in order to perform the measurement of the molecular weight pre-modification. A cyclohexane solution containing 1-(3-triethoxysilylpropyl)-2,2,5,5-tetramethyl-1-aza-2,5-disilacyclopentane (2.48 mmol) was added and a reaction was run for 15 minutes. After this reaction, a cyclohexane solution containing 3-aminopropyltriethoxysilane (2.48 mmol) was added to the polymer solution; mixing was performed for 5 minutes; a cyclohexane solution containing silicon tetrachloride (2.69 mmol) was thereafter added; and mixing was subsequently performed for 5 minutes. 2.0 g of 2,6-di-tert-butyl-p-cresol was then added to the resulting polymer solution. This was followed by solvent removal by steam stripping using hot water adjusted to pH=5 with sulfuric acid. The rubber was dried on a hot roll thermostatted to 110° C. to yield modified conjugated diene rubber C.

The polymerization recipe for modified conjugated diene rubber C is given in Table 1, while the properties of the obtained modified conjugated diene rubber C are given in Table 2. Using the modified conjugated diene rubber C, a rubber composition was prepared in accordance with the compounding recipe given in Table 3 and was vulcanized and property evaluation was performed. The results are shown in Table 4.

Example 4

Synthesis and Evaluation of Modified Conjugated Diene Rubber D

A modified conjugated diene rubber D was obtained using the same method as in Example 2, but in this case using N-[3-(trimethoxysilyl)propyl]-N,N'-diethyl-N'-trimethylsilylethane-1,2-diamine in place of the N,N',N'-tris(trimethylsilyl)-N-(2-aminoethyl)-3-aminopropyltriethoxysilane used in Example 2.

The polymerization recipe for modified conjugated diene rubber D is given in Table 1, while the properties of the obtained modified conjugated diene rubber D are given in Table 2. Using the modified conjugated diene rubber D, a rubber composition was prepared in accordance with the compounding recipe given in Table 3 and was vulcanized and property evaluation was performed. The results are shown in Table 4.

Example 5

Synthesis and Evaluation of Modified Conjugated Diene Rubber E

A modified conjugated diene rubber E was obtained using the same method as in Example 2, but in this case using 3-(4-trimethylsilyl-1-piperazino)propyltriethoxysilane in place of the N,N',N'-tris(trimethylsilyl)-N-(2-aminoethyl)-3-aminopropyltriethoxysilane used in Example 2.

The polymerization recipe for modified conjugated diene rubber E is given in Table 1, while the properties of the obtained modified conjugated diene rubber E are given in Table 2. Using the modified conjugated diene rubber E, a rubber composition was prepared in accordance with the compounding recipe given in Table 3 and was vulcanized and property evaluation was performed. The results are shown in Table 4.

Example 6

Synthesis and Evaluation of Modified Conjugated Diene Rubber F

A modified conjugated diene rubber F was obtained using the same method as in Example 1, but in this case using bis[3-(triethoxysilyl)propyl]trimethylsilylamine (2.48 mmol) in place of the N,N-bis(triethylsilyl)aminopropylmethyldimethoxysilane (4.96 mmol) used in Example 1 and changing the 3.93 mmol amount of silicon tetrachloride addition used in Example 1 to 3.31 mmol.

The polymerization recipe for modified conjugated diene rubber F is given in Table 1, while the properties of the obtained modified conjugated diene rubber F are given in Table 2. Using the modified conjugated diene rubber F, a rubber composition was prepared in accordance with the compounding recipe given in Table 3 and was vulcanized and property evaluation was performed. The results are shown in Table 4.

Example 7

Synthesis and Evaluation of Modified Conjugated Diene Rubber G

A modified conjugated diene rubber G was obtained using the same method as in Example 1, but in this case using 3-diethylaminopropyltriethoxysilane in place of the N,N-bis(triethylsilyl)aminopropylmethyldimethoxysilane used in Example 1.

The polymerization recipe for modified conjugated diene rubber G is given in Table 1, while the properties of the obtained modified conjugated diene rubber G are given in Table 2. Using the modified conjugated diene rubber G, a rubber composition was prepared in accordance with the compounding recipe given in Table 3 and was vulcanized and property evaluation was performed. The results are shown in Table 4.

Example 8

Synthesis and Evaluation of Modified Conjugated Diene Rubber H

A modified conjugated diene rubber H was obtained using the same method as in Example 1, but in this case using S-trimethylsilylmercaptopropyltriethoxysilane in place of the N,N-bis(triethylsilyl)aminopropylmethyldimethoxysilane used in Example 1.

The polymerization recipe for modified conjugated diene rubber H is given in Table 1, while the properties of the obtained modified conjugated diene rubber H are given in Table 2. Using the modified conjugated diene rubber H, a rubber composition was prepared in accordance with the compounding recipe given in Table 3 and was vulcanized and property evaluation was performed. The results are shown in Table 4.

Example 9

Synthesis and Evaluation of Modified Conjugated Diene Rubber I

A modified conjugated diene rubber I was obtained using the same method as in Example 1, but in this case using 3-diphenylphosphinopropyltrimethoxysilane in place of the N,N-bis(triethylsilyl)aminopropylmethyldimethoxysilane used in Example 1.

The polymerization recipe for modified conjugated diene rubber I is given in Table 1, while the properties of the obtained modified conjugated diene rubber I are given in Table 2. Using the modified conjugated diene rubber I, a rubber composition was prepared in accordance with the compounding recipe given in Table 3 and was vulcanized and property evaluation was performed. The results are shown in Table 4.

Example 10

Synthesis and Evaluation of Modified Conjugated Diene Rubber J

A modified conjugated diene rubber J was obtained using the same method as in Example 1, but in this case using mercaptopropyltriethoxysilane in place of the 3-aminopropyltriethoxysilane used in Example 1.

The polymerization recipe for modified conjugated diene rubber J is given in Table 1, while the properties of the obtained modified conjugated diene rubber J are given in Table 2. Using the modified conjugated diene rubber J, a rubber composition was prepared in accordance with the compounding recipe given in Table 3 and was vulcanized and property evaluation was performed. The results are shown in Table 4.

Example 11

Synthesis and Evaluation of Modified Conjugated Diene Rubber K

A cyclohexane solution containing 2,750 g of cyclohexane, 3.25 g of 2,2-di(tetrahydrofuryl)propane, 125 g of styrene, 365 g of 1,3-butadiene, and piperidine (4.70 mmol) was charged to a 5 L autoclave reactor that had been substituted with nitrogen. The temperature of the reactor contents was adjusted to 10° C. followed by the addition of a cyclohexane solution containing n-butyllithium (5.80 mmol) to initiate polymerization. The polymerization was run adiabatically and a maximum temperature of 85° C. was reached.

When the polymerization conversion had reached 99%, a supplemental addition of 10 g of butadiene was made and polymerization was run for an additional 5 minutes, after which 10 g of the polymer solution was sampled out in order to perform the measurement of the molecular weight pre-modification. A cyclohexane solution containing N,N-bis(triethylsilyl)aminopropylmethyldimethoxysilane (4.96 mmol) was added and a reaction was run for 15 minutes. After this reaction, a cyclohexane solution containing N-2-(aminoethyl)-3-aminopropyltrimethoxysilane (4.96 mmol) was added to the polymer solution; mixing was performed for 5 minutes; a cyclohexane solution containing silicon tetrachloride (6.34 mmol) was thereafter added; and mixing was subsequently performed for 5 minutes. 4.0 g of 2,6-di-tert-butyl-p-cresol was then added to the resulting polymer solution. This was followed by solvent removal by steam stripping using hot water adjusted to pH=10 with sodium hydroxide. The rubber was dried on a hot roll thermostatted to 110° C. to yield modified conjugated diene rubber K.

The polymerization recipe for modified conjugated diene rubber K is given in Table 1, while the properties of the obtained modified conjugated diene rubber K are given in Table 2. Using the modified conjugated diene rubber K, a rubber composition was prepared in accordance with the compounding recipe given in Table 3 and was vulcanized and property evaluation was performed. The results are shown in Table 4.

Example 12

Synthesis and Evaluation of Modified Conjugated Diene Rubber L

A modified conjugated diene rubber L was obtained using the same method as in Example 11, but in this case using 3-aminopropyltriethoxysilane (9.92 mmol) in place of the N-2-(aminoethyl)-3-aminopropyltrimethoxysilane (4.96 mmol) used in Example 11.

The polymerization recipe for modified conjugated diene rubber L is given in Table 1, while the properties of the obtained modified conjugated diene rubber L are given in Table 2. Using the modified conjugated diene rubber L, a rubber composition was prepared in accordance with the compounding recipe given in Table 3 and was vulcanized and property evaluation was performed. The results are shown in Table 4.

Example 13

Synthesis and Evaluation of Modified Conjugated Diene Rubber M

A modified conjugated diene rubber M was obtained using the same method as in Example 11, but in this case using 3-aminopropyltriethoxysilane in place of the N-2-(aminoethyl)-3-aminopropyltrimethoxysilane used in Example 11 and using diethylaluminum chloride (20.4 mmol) in place of the silicon tetrachloride (6.34 mmol) used in Example 11.

The polymerization recipe for modified conjugated diene rubber M is given in Table 1, while the properties of the obtained modified conjugated diene rubber M are given in Table 2. Using the modified conjugated diene rubber M, a rubber composition was prepared in accordance with the compounding recipe given in Table 3 and was vulcanized and property evaluation was performed. The results are shown in Table 4.

Example 14

Synthesis and Evaluation of Modified Conjugated Diene Rubber N

A modified conjugated diene rubber N was obtained using the same method as in Example 13, but in this case using titanium tetrachloride (5.10 mmol) in place of the diethylaluminum chloride (20.4 mmol) used in Example 13.

The polymerization recipe for modified conjugated diene rubber N is given in Table 1, while the properties of the obtained modified conjugated diene rubber N are given in Table 2. Using the modified conjugated diene rubber N, a rubber composition was prepared in accordance with the compounding recipe given in Table 3 and was vulcanized and property evaluation was performed. The results are shown in Table 4.

Example 15

Synthesis and Evaluation of Modified Conjugated Diene Rubber O

A modified conjugated diene rubber 0 was obtained using the same method as in Example 13, but in this case using isopropyl acid phosphate (13.61 mmol) in place of the diethylaluminum chloride (20.4 mmol) used in Example 13.

The polymerization recipe for modified conjugated diene rubber O is given in Table 1, while the properties of the obtained modified conjugated diene rubber O are given in Table 2. Using the modified conjugated diene rubber O, a rubber composition was prepared in accordance with the compounding recipe given in Table 3 and was vulcanized and property evaluation was performed. The results are shown in Table 4.

Example 16

Synthesis and Evaluation of Modified Conjugated Diene Rubber P 2,750 g of cyclohexane, 100.0 g of tetrahydrofuran, 180 g of styrene, and 310 g of 1,3-butadiene were charged to a 5 L autoclave reactor that had been substituted with nitrogen. The temperature of the reactor contents was adjusted to 20° C. followed by the addition of a cyclohexane solution containing n-butyllithium (4.60 mmol) to initiate polymerization. The polymerization was run adiabatically and a maximum temperature of 85° C. was reached.

When the polymerization conversion had reached 99%, a supplemental addition of 10 g of butadiene was made and polymerization was run for an additional 5 minutes, after which 10 g of the polymer solution was sampled out in order to perform the measurement of the molecular weight pre-modification. A cyclohexane solution containing N,N-bis(triethylsilyl)aminopropylmethyldimethoxysilane (3.93 mmol) was added and a reaction was run for 15 minutes. After this reaction, a cyclohexane solution containing 3-aminopropyltriethoxysilane (3.93 mmol) was added to the polymer solution; mixing was performed for 5 minutes; a cyclohexane solution containing silicon tetrachloride (3.12 mmol) was thereafter added; and mixing was subsequently performed for 5 minutes. 2.0 g of 2,6-di-tert-butyl-p-cresol was then added to the resulting polymer solution; 187.5 g of naphthenic oil (trademark: SNH46, from Sankyo Yuka Kogyo Kabushiki Kaisha) was thereafter added; and mixing was performed for 5 minutes. This was followed by solvent removal by steam stripping using hot water adjusted to pH=9 with sodium hydroxide. The rubber was dried on a hot roll thermostatted to 110° C. to yield modified conjugated diene rubber P.

The polymerization recipe for modified conjugated diene rubber P is given in Table 1, while the properties of the obtained modified conjugated diene rubber P are given in Table 2. Using the modified conjugated diene rubber P, a rubber composition was prepared in accordance with the compounding recipe given in Table 3 and was vulcanized and property evaluation was performed. The results are shown in Table 4.

Example 17

Synthesis and Evaluation of Modified Conjugated Diene Rubber Q

A modified conjugated diene rubber Q was obtained using the same method as in Example 3, but in this case adding the silicon tetrachloride used in Example 3 firstly and the 3-aminopropyltriethoxysilane secondly.

The polymerization recipe for modified conjugated diene rubber Q is given in Table 1, while the properties of the obtained modified conjugated diene rubber Q are given in Table 2. Using the modified conjugated diene rubber Q, a rubber composition was prepared in accordance with the compounding recipe given in Table 3 and was vulcanized and property evaluation was performed. The results are shown in Table 4.

Example 18

Synthesis and Evaluation of Modified Conjugated Diene Rubber R

A modified conjugated diene rubber R was obtained using the same method as in Example 3, but in this case adding the 3-aminopropyltriethoxysilane and the silicon tetrachloride used in Example 3 at the same time.

The polymerization recipe for modified conjugated diene rubber R is given in Table 1, while the properties of the obtained modified conjugated diene rubber R are given in Table 2. Using the modified conjugated diene rubber R, a rubber composition was prepared in accordance with the compounding recipe given in Table 3 and was vulcanized and property evaluation was performed. The results are shown in Table 4.

Comparative Example 1

Synthesis and Evaluation of Modified Conjugated Diene Rubber S

A modified conjugated diene rubber S was obtained using the same method as in Example 1, but in this case without adding the 3-aminopropyltriethoxysilane used in Example 1.

The polymerization recipe for modified conjugated diene rubber S is given in Table 1, while the properties of the obtained modified conjugated diene rubber S are given in Table 2. Using the modified conjugated diene rubber S, a rubber composition was prepared in accordance with the compounding recipe given in Table 3 and was vulcanized and property evaluation was performed. The results are shown in Table 4.

Comparative Example 2

Synthesis and Evaluation of Modified Conjugated Diene Rubber T

A modified conjugated diene rubber T was obtained using the same method as in Comparative Example 1, but in this case changing the quantity of silicon tetrachloride addition of 3.93 mmol used in Comparative Example 1 to 2.69 mmol.

The polymerization recipe for modified conjugated diene rubber T is given in Table 1, while the properties of the obtained modified conjugated diene rubber T are given in Table 2. Using the modified conjugated diene rubber T, a rubber composition was prepared in accordance with the compounding recipe given in Table 3 and was vulcanized and property evaluation was performed. The results are shown in Table 4.

Comparative Example 3

Synthesis and Evaluation of Modified Conjugated Diene Rubber U

A modified conjugated diene rubber U was obtained using the same method as in Example 1, but in this case without adding the silicon tetrachloride used in Example 1.

The polymerization recipe for modified conjugated diene rubber U is given in Table 1, while the properties of the obtained modified conjugated diene rubber U are given in Table 2. Using the modified conjugated diene rubber U, a rubber composition was prepared in accordance with the compounding recipe given in Table 3 and was vulcanized and property evaluation was performed. The results are shown in Table 4.

Comparative Example 4

Synthesis and Evaluation of Modified Conjugated Diene Rubber V

A modified conjugated diene rubber V was obtained using the same method as in Example 16, but in this case without adding the 3-aminopropyltriethoxysilane used in Example 16.

The polymerization recipe for modified conjugated diene rubber V is given in Table 1, while the properties of the obtained modified conjugated diene rubber V are given in Table 2. Using the modified conjugated diene rubber V, a rubber composition was prepared in accordance with the compounding recipe given in Table 3 and was vulcanized and property evaluation was performed. The results are shown in Table 4.

Comparative Example 5

Synthesis and Evaluation of Modified Conjugated Diene Rubber W

A modified conjugated diene rubber W was obtained using the same method as in Example 1, but in this case using tetraethoxysilane in place of the N,N-bis(triethylsilyl)aminopropylmethyldimethoxysilane used in Example 1 and changing the quantity of silicon tetrachloride addition from the 3.93 mmol used in Example 1 to 2.69 mmol.

The polymerization recipe for modified conjugated diene rubber W is given in Table 1, while the properties of the obtained modified conjugated diene rubber W are given in Table 2. Using the modified conjugated diene rubber W, a rubber composition was prepared in accordance with the compounding recipe given in Table 3 and was vulcanized and property evaluation was performed. The results are shown in Table 4.

Comparative Example 6

Synthesis and Evaluation of Modified Conjugated Diene Rubber X

A modified conjugated diene rubber X was obtained using the same method as in Comparative Example 5, but in this case using stannous 2-ethylhexanoate in place of the silicon tetrachloride used in Comparative Example 5.

The polymerization recipe for modified conjugated diene rubber X is given in Table 1, while the properties of the obtained modified conjugated diene rubber X are given in Table 2. Using the modified conjugated diene rubber X, a rubber composition was prepared in accordance with the compounding recipe given in Table 3 and was vulcanized and property evaluation was performed. The results are shown in Table 4.

Comparative Example 7

Synthesis and Evaluation of Conjugated Diene Rubber Y 2,750 g of cyclohexane, 50.0 g of tetrahydrofuran, 125 g of styrene, and 365 g of 1,3-butadiene were charged to a 5 L autoclave reactor that had been substituted with nitrogen. The temperature of the reactor contents was adjusted to 10° C. followed by the addition of a cyclohexane solution containing n-butyllithium (5.80 mmol) to initiate polymerization. The polymerization was run adiabatically and a maximum temperature of 85° C. was reached.

When the polymerization conversion had reached 99%, a supplemental addition of 10 g of butadiene was made and polymerization was run for an additional 5 minutes, after which a cyclohexane solution containing silicon tetrachloride (1.04 mmol) was added and a reaction was run for 15 minutes. 2.0 g of 2,6-di-tert-butyl-p-cresol was then added to the resulting polymer solution. This was followed by solvent removal by steam stripping using hot water adjusted to pH=9 with sodium hydroxide. The rubber was dried on a hot roll thermostatted to 110° C. to yield conjugated diene rubber Y.

The polymerization recipe for conjugated diene rubber Y is given in Table 1, while the properties of the obtained conjugated diene rubber Y are given in Table 2. Using the conjugated diene rubber Y, a rubber composition was prepared in accordance with the compounding recipe given in Table 3 and was vulcanized and property evaluation was performed. The results are shown in Table 4.

[The Method for Mixing (Kneading) the Rubber Compositions and Property Evaluation]

Using a Plastomill (250 cc capacity) equipped with a temperature control device, the following were mixed/kneaded in a first-stage mixing/kneading at a fill rate of 72% and 60 rpm: the modified conjugated diene rubber of the present invention, butadiene rubber, natural rubber, extender oil, carbon black, silica, silane coupling agent, stearic acid, ageing inhibitor, and zinc white (i.e. zinc oxide). Then, after the blend obtained as described above was cooled to room temperature, the sulfur and vulcanization accelerator were mixed/kneaded in a second-stage mixing/kneading. This was molded and vulcanized with a vulcanization press for a prescribed period of time at 160° C. and the following property evaluations, which are indicative of tire performance, were carried out.

(i) Mooney viscosity: The pre-vulcanized rubber composition was used for the measurement sample and measurement was performed in accordance with JIS K 6300 using an L rotor and the following conditions: preheating for 1 minute, rotor running time=4 minutes, and temperature=100° C.

(ii) Tensile strength: The 300% modulus was measured according to JIS K 6301. This is reported as an index, wherein larger numerical values indicate a higher tensile strength and thus are better.

(iii) tan δ at 0° C.: The vulcanized rubber was used as the measurement sample. The measurement was carried out at a tensile dynamic strain of 0.14%, an angular velocity of 100 radians per second, and 0° C. using a dynamic spectrometer (manufactured by Rheometrics (USA)). This is reported as an index, wherein larger numerical values indicate a higher wet skid resistance and thus are better.

(iv) tan δ at 70° C.: The vulcanized rubber was used as the measurement sample. The measurement was carried out at a tensile dynamic strain of 0.7%, an angular velocity of 100 radians per second, and 70° C. using a dynamic spectrometer (manufactured by Rheometrics (USA)). This is reported as an index, wherein larger numerical values indicate a smaller low hysteresis loss character and thus are better.

(v) Wear resistance: The vulcanized rubber was used as the measurement sample. The measurement was performed at 25° C. with a load of 10 N in accordance with JIS K 6264 using a DIN abrasion tester (manufactured by Toyo Seiki Seisaku-sho, Ltd.). This is reported as an index, wherein larger numerical values indicate a better wear resistance.

As is clear from Table 2, the modified conjugated diene rubber U of Comparative Example 3, which did not use an onium generator, has a very large cold flow value, thus demonstrating a problem in terms of shape retention by the rubber.

As is also clear from Table 4, the compositions of the present invention, which used a modified conjugated diene rubber according to the present invention, are shown to have a substantially improved balance between the wet skid resistance and the low hysteresis loss behavior, without a loss in tensile strength or wear resistance.

The results of the property evaluations for the modified conjugated diene rubbers S to V of Comparative Examples 1 to 4 demonstrate that both of the steps (a) and (b) of the present invention are crucial for improving the balance between the wet skid resistance and the low hysteresis loss behavior.

The results of the property evaluations for the modified conjugated diene rubber W of Comparative Example 5 demonstrate that the modification in step (a) with an alkoxysilane compound having a group convertible to onium is crucial for improving the balance between the low hysteresis loss behavior and the tensile strength, wear resistance, and wet skid resistance.

The results of the property evaluations for the modified conjugated diene rubber X of Comparative Example 6 demonstrate that the use of an onium generator is crucial for improving the balance between the low hysteresis loss behavior and the tensile strength, wear resistance, and wet skid resistance and that a general catalyst of alkoxysilane compound condensation is unrelated to the exhibition of a satisfactory performance.

TABLE 1

| | | | Example 1 | Example 2 | Example 3 | Example 4 | Exmple 5 | Example 6 |
|---|---|---|---|---|---|---|---|---|
| | | | \multicolumn{6}{c}{type of modified conjugated diene rubber} |
| | | | A | B | C | D | E | F |
| polymerization recipe solvent | | | | | | | | |
| cyclohexane | | (g) | 2750 | 2750 | 2750 | 2750 | 2750 | 2750 |
| vinyl content modifier | | | | | | | | |
| tetrahydrofuran | | (g) | 50.0 | 50.0 | 10.3 | 50.0 | 50.0 | 50.0 |
| 2,2-di(tetrahydrofuryl)propane | | (mmol) | — | — | — | — | — | — |
| polymerization monomer | | | | | | | | |
| styrene | | (g) | 125 | 125 | 50 | 125 | 125 | 125 |
| butadiene | | (g) | 365 | 365 | 440 | 365 | 365 | 365 |
| supplemental butadiene | | (g) | 10 | 10 | 10 | 10 | 10 | 10 |
| polymerization initiator | | | | | | | | |
| piperidine | | (mmol) | — | — | — | — | — | — |
| n-butyllithium | | (mmol) | 5.80 | 5.80 | 5.80 | 5.80 | 5.80 | 5.80 |
| first alkoxysilane compound | | | | | | | | |
| N-Si-1 | *1 | (mmol) | 4.96 | — | — | — | — | — |
| N-Si-2 | *2 | (mmol) | — | 4.96 | — | — | — | — |
| N-Si-3 | *3 | (mmol) | — | — | 2.48 | — | — | — |
| N-Si-4 | *4 | (mmol) | — | — | — | 4.96 | — | — |
| N-Si-5 | *5 | (mmol) | — | — | — | — | 4.96 | — |
| N-Si-6 | *6 | (mmol) | — | — | — | — | — | 2.48 |
| N-Si-7 | *7 | (mmol) | — | — | — | — | — | — |
| S-Si-1 | *8 | (mmol) | — | — | — | — | — | — |
| P-Si-1 | *9 | (mmol) | — | — | — | — | — | — |
| Si-1 | *10 | (mmol) | — | — | — | — | — | — |
| second alkoxysilane compound | | | | | | | | |
| N-1 | *11 | (mmol) | 4.96 | 4.96 | 2.48 | 4.96 | 4.96 | 4.96 |
| N-2 | *12 | (mmol) | — | — | — | — | — | — |
| S-1 | *13 | (mmol) | — | — | — | — | — | — |
| onium generator | | | | | | | | |
| Cl-1 | *14 | (mmol) | 3.93 | 5.17 | 2.69 | 5.17 | 5.17 | 3.31 |
| Cl-2 | *15 | (mmol) | — | — | — | — | — | — |
| Cl-3 | *16 | (mmol) | — | — | — | — | — | — |
| P-1 | *17 | (mmol) | — | — | — | — | — | — |
| condensation catalyst | | | | | | | | |
| Sn-1 | *18 | (mmol) | — | — | — | — | — | — |
| extender oil | | | | | | | | |
| Oil | *19 | (g) | — | — | — | — | — | — |

| | | | Example 7 | Example 8 | Example 9 | Example 10 | Example 11 | Example 12 |
|---|---|---|---|---|---|---|---|---|
| | | | \multicolumn{6}{c}{type of modified conjugated diene rubber} |
| | | | G | H | I | J | K | L |
| polymerization recipe solvent | | | | | | | | |
| cyclohexane | | (g) | 2750 | 2750 | 2750 | 2750 | 2750 | 2750 |
| vinyl content modifier | | | | | | | | |
| tetrahydrofuran | | (g) | 50.0 | 50.0 | 50.0 | 50.0 | — | — |
| 2,2-di(tetrahydrofuryl)propane | | (mmol) | — | — | — | — | 3.25 | 3.25 |
| polymerization monomer | | | | | | | | |
| styrene | | (g) | 125 | 125 | 125 | 125 | 125 | 125 |
| butadiene | | (g) | 365 | 365 | 365 | 365 | 365 | 365 |
| supplemental butadiene | | (g) | 10 | 10 | 10 | 10 | 10 | 10 |
| polymerization initiator | | | | | | | | |
| piperidine | | (mmol) | — | — | — | — | 4.70 | 4.70 |
| n-butyllithium | | (mmol) | 5.80 | 5.80 | 5.80 | 5.80 | 5.80 | 5.80 |
| first alkoxysilane compound | | | | | | | | |
| N-Si-1 | *1 | (mmol) | — | — | — | 4.96 | 4.96 | 4.96 |
| N-Si-2 | *2 | (mmol) | — | — | — | — | — | — |
| N-Si-3 | *3 | (mmol) | — | — | — | — | — | — |
| N-Si-4 | *4 | (mmol) | — | — | — | — | — | — |

TABLE 1-continued

| | | | | | | | | |
|---|---|---|---|---|---|---|---|---|
| N-Si-5 | *5 | (mmol) | — | — | — | — | — | — |
| N-Si-6 | *6 | (mmol) | — | — | — | — | — | — |
| N-Si-7 | *7 | (mmol) | 4.96 | — | — | — | — | — |
| S-Si-1 | *8 | (mmol) | — | 4.96 | — | — | — | — |
| P-Si-1 | *9 | (mmol) | — | — | 4.96 | — | — | — |
| Si-1 | *10 | (mmol) | — | — | — | — | — | — |
| second alkoxysilane compound | | | | | | | | |
| N-1 | *11 | (mmol) | 4.96 | 4.96 | 4.96 | — | — | 9.92 |
| N-2 | *12 | (mmol) | — | — | — | — | 4.96 | — |
| S-1 | *13 | (mmol) | — | — | — | 4.96 | — | — |
| onium generator | | | | | | | | |
| Cl-1 | *14 | (mmol) | 3.93 | 3.93 | 3.93 | 3.93 | 6.34 | 6.34 |
| Cl-2 | *15 | (mmol) | — | — | — | — | — | — |
| Cl-3 | *16 | (mmol) | — | — | — | — | — | — |
| P-1 | *17 | (mmol) | — | — | — | — | — | — |
| condensation catalyst | | | | | | | | |
| Sn-1 | *18 | (mmol) | — | — | — | — | — | — |
| extender oil | | | | | | | | |
| Oil | *19 | (g) | — | — | — | — | — | — |

| | | | Example 13 | Example 14 | Example 15 | Example 16 | Example 17 | Example 18 |
|---|---|---|---|---|---|---|---|---|
| | | | \multicolumn{6}{c}{type of modified conjugated diene rubber} |
| | | | M | N | O | P | Q | R |
| polymerization recipe solvent | | | | | | | | |
| cyclohexane | | (g) | 2750 | 2750 | 2750 | 2750 | 2750 | 2750 |
| vinyl content modifier | | | | | | | | |
| tetrahydrofuran | | (g) | — | — | — | 100.0 | 10.3 | 10.3 |
| 2,2-di(tetrahydrofuryl)propane | | (mmol) | 3.25 | 3.25 | 3.25 | — | — | — |
| polymerization monomer | | | | | | | | |
| styrene | | (g) | 125 | 125 | 125 | 180 | 50 | 50 |
| butadiene | | (g) | 365 | 365 | 365 | 310 | 440 | 440 |
| supplemental butadiene | | (g) | 10 | 10 | 10 | 10 | 10 | 10 |
| polymerization initiator | | | | | | | | |
| piperidine | | (mmol) | 4.70 | 4.70 | 4.70 | — | — | — |
| n-butyllithium | | (mmol) | 5.80 | 5.80 | 5.80 | 4.60 | 5.80 | 5.80 |
| first alkoxysilane compound | | | | | | | | |
| N-Si-1 | *1 | (mmol) | 4.96 | 4.96 | 4.96 | 3.93 | — | — |
| N-Si-2 | *2 | (mmol) | — | — | — | — | — | — |
| N-Si-3 | *3 | (mmol) | — | — | — | — | 2.48 | 2.48 |
| N-Si-4 | *4 | (mmol) | — | — | — | — | — | — |
| N-Si-5 | *5 | (mmol) | — | — | — | — | — | — |
| N-Si-6 | *6 | (mmol) | — | — | — | — | — | — |
| N-Si-7 | *7 | (mmol) | — | — | — | — | — | — |
| S-Si-1 | *8 | (mmol) | — | — | — | — | — | — |
| P-Si-1 | *9 | (mmol) | — | — | — | — | — | — |
| Si-1 | *10 | (mmol) | — | — | — | — | — | — |
| second alkoxysilane compound | | | | | | | | |
| N-1 | *11 | (mmol) | 4.96 | 4.96 | 4.96 | 3.93 | 2.48 | 2.48 |
| N-2 | *12 | (mmol) | — | — | — | — | — | — |
| S-1 | *13 | (mmol) | — | — | — | — | — | — |
| onium generator | | | | | | | | |
| Cl-1 | *14 | (mmol) | — | — | — | 3.12 | 2.69 | 2.69 |
| Cl-2 | *15 | (mmol) | 20.4 | — | — | — | — | — |
| Cl-3 | *16 | (mmol) | — | 5.10 | — | — | — | — |
| P-1 | *17 | (mmol) | — | — | 13.61 | — | — | — |
| condensation catalyst | | | | | | | | |
| Sn-1 | *18 | (mmol) | — | — | — | — | — | — |
| extender oil | | | | | | | | |
| Oil | *19 | (g) | — | — | — | 187.5 | — | — |

TABLE 1-continued

|  |  | Comparative Example 1 | Comparative Example 2 | Comparative Example 3 | Comparative Example 4 | Comparative Exmple 5 | Comparative Example 6 |
|---|---|---|---|---|---|---|---|
|  |  | \multicolumn{6}{c}{type of modified conjugated diene rubber} |
|  |  | S | T | U | V | W | X |
| polymerization recipe solvent |  |  |  |  |  |  |  |
| cyclohexane | (g) | 2750 | 2750 | 2750 | 2750 | 2750 | 2750 |
| vinyl content modifier |  |  |  |  |  |  |  |
| tetrahydrofuran | (g) | 50.0 | 50.0 | 50.0 | 100.0 | 50.0 | 50.0 |
| 2,2-di(tetrahydrofuryl)propane | (mmol) | — | — | — | — | — | — |
| polymerization monomer |  |  |  |  |  |  |  |
| styrene | (g) | 125 | 125 | 125 | 180 | 125 | 125 |
| butadiene | (g) | 365 | 365 | 365 | 310 | 365 | 365 |
| supplemental butadiene | (g) | 10 | 10 | 10 | 10 | 10 | 10 |
| polymerization initiator |  |  |  |  |  |  |  |
| piperidine | (mmol) | — | — | — | — | — | — |
| n-butyllithium | (mmol) | 5.80 | 5.80 | 5.80 | 4.60 | 5.80 | 5.80 |
| first alkoxysilane compound |  |  |  |  |  |  |  |
| N-Si-1 | *1 (mmol) | 4.96 | 4.96 | 4.96 | 3.93 | — | — |
| N-Si-2 | *2 (mmol) | — | — | — | — | — | — |
| N-Si-3 | *3 (mmol) | — | — | — | — | — | — |
| N-Si-4 | *4 (mmol) | — | — | — | — | — | — |
| N-Si-5 | *5 (mmol) | — | — | — | — | — | — |
| N-Si-6 | *6 (mmol) | — | — | — | — | — | — |
| N-Si-7 | *7 (mmol) | — | — | — | — | — | — |
| S-Si-1 | *8 (mmol) | — | — | — | — | — | — |
| P-Si-1 | *9 (mmol) | — | — | — | — | — | — |
| Si-1 | *10 (mmol) | — | — | — | — | 4.96 | 4.96 |
| second alkoxysilane compound |  |  |  |  |  |  |  |
| N-1 | *11 (mmol) | — | — | 4.96 | — | 4.96 | 4.96 |
| N-2 | *12 (mmol) | — | — | — | — | — | — |
| S-1 | *13 (mmol) | — | — | — | — | — | — |
| onium generator |  |  |  |  |  |  |  |
| Cl-1 | *14 (mmol) | 3.93 | 2.69 | — | 3.12 | 2.69 | — |
| Cl-2 | *15 (mmol) | — | — | — | — | — | — |
| Cl-3 | *16 (mmol) | — | — | — | — | — | — |
| P-1 | *17 (mmol) | — | — | — | — | — | — |
| condensation catalyst |  |  |  |  |  |  |  |
| Sn-1 | *18 (mmol) | — | — | — | — | — | 2.69 |
| extender oil |  |  |  |  |  |  |  |
| Oil | *19 (g) | — | — | — | 187.5 | — | — |

|  |  | Comparative Example 7 type of modified conjugated diene rubber Y |
|---|---|---|
| polymerization recipe solvent |  |  |
| cyclohexane | (g) | 2750 |
| vinyl content modifier |  |  |
| tetrahydrofuran | (g) | 50.0 |
| 2,2-di(tetrahydrofuryl)propane | (mmol) | — |
| polymerization monomer |  |  |
| styrene | (g) | 125 |
| butadiene | (g) | 365 |
| supplemental butadiene | (g) | 10 |
| polymerization initiator |  |  |
| piperidine | (mmol) | — |
| n-butyllithium | (mmol) | 5.80 |
| first alkoxysilane compound |  |  |
| N-Si-1 | *1 (mmol) | — |
| N-Si-2 | *2 (mmol) | — |
| N-Si-3 | *3 (mmol) | — |

TABLE 1-continued

|  |  |  |  |  |
|---|---|---|---|---|
| N-Si-4 |  | *4 | (mmol) | — |
| N-Si-5 |  | *5 | (mmol) | — |
| N-Si-6 |  | *6 | (mmol) | — |
| N-Si-7 |  | *7 | (mmol) | — |
| S-Si-1 |  | *8 | (mmol) | — |
| P-Si-1 |  | *9 | (mmol) | — |
| Si-1 |  | *10 | (mmol) | — |
| second alkoxysilane compound |  |  |  |  |
| N-1 |  | *11 | (mmol) | — |
| N-2 |  | *12 | (mmol) | — |
| S-1 |  | *13 | (mmol) | — |
| onium generator |  |  |  |  |
| Cl-1 |  | *14 | (mmol) | 1.04 |
| Cl-2 |  | *15 | (mmol) | — |
| Cl-3 |  | *16 | (mmol) | — |
| P-1 |  | *17 | (mmol) | — |
| condensation catalyst |  |  |  |  |
| Sn-1 |  | *18 | (mmol) | — |
| extender oil |  |  |  |  |
| Oil |  | *19 | (g) | — |

*1; N,N-bis(triethylsilyl)aminopropylmethyldimethoxysilane
*2; N,N',N-tris(trimethylsilyl)-N-(2-aminoethyl)-3-aminopropyltriethoxysilane
*3; 1-(3-triethoxysilylpropyl)-2,2,5,5-tetramethyl-1-aza-2,5-disilacyclopentane
*4; N-[3-(trimethoxysilyl)-propyl]-N ,N'-diethyl-N'-trimethylsilyl-ethane-1,2-diamine
*5; 3-(4-trimethylsilyl-1-piperazino)propyltriethoxysilane
*6; bis[3-(triethoxysily)propyl]trimethylsilylamine
*7; 3-diethylaminopropyltriethoxysilane
*8; S-trimethylsilylmercaptopropyltriethoxysilane
*9; 3-diphenylphosphinopropyltrimethoxysilane
*10; tetraethoxysilane
*11; 3-aminopropyltriethoxysilane
*12; N-2-(aminoethyl)-3-aminopropyltrimethoxysilane
*13; mercaptopropyltriethoxysilane
*14; silicon tetrachloride
*15; diethylaluminum choride
*16; titanium tetrachloride
*17; isopropyl acid phosphate
*18; stannous 2-ethylhexanoate
*19; naphtenic oil (PCA content less than 3%)

TABLE 2

|  |  | Example 1 | Example 2 | Example 3 | Example 4 | Example 5 | Example 6 | Example 7 | Example 8 |
|---|---|---|---|---|---|---|---|---|---|
|  |  | type of modified conjugated diene rubber | | | | | | | |
|  |  | A | B | C | D | E | F | G | H |
| [properties of modified conjugated diene rubber] | | | | | | | | | |
| bonded styrene content | (mass %) | 25 | 25 | 10 | 25 | 25 | 25 | 25 | 25 |
| vinyl content | (%) | 55 | 56 | 41 | 55 | 55 | 54 | 56 | 55 |
| glass-transition temperature | (° C.) | −30 | −31 | −60 | −31 | −30 | −30 | −30 | −31 |
| weight average molecular weight prior to modification (×10⁴) | | 20 | 20 | 18 | 19 | 20 | 19 | 20 | 20 |
| Mooney viscosity | (ML1+4, 100° C.) | 65 | 73 | 68 | 65 | 64 | 63 | 58 | 50 |
| cold flow value | (mg/minute) | 0.2 | 0.1 | 0.2 | 0.2 | 0.2 | 0.2 | 0.2 | 0.2 |
|  |  | Example 9 | Example 10 | Example 11 | Example 12 | Example 13 | Example 14 | Example 15 | Example 16 |
|  |  | type of modified conjugated diene rubber | | | | | | | |
|  |  | I | J | K | L | M | N | O | P |
| [properties of modified conjugated diene rubber] | | | | | | | | | |
| bonded styrene content | (mass %) | 25 | 25 | 25 | 25 | 25 | 25 | 25 | 36 |
| vinyl content | (%) | 56 | 56 | 56 | 56 | 56 | 56 | 56 | 62 |
| glass-transition temperature | (° C.) | −30 | −31 | −32 | −32 | −33 | −32 | −32 | −13 |

TABLE 2-continued

|  |  |  |  |  |  |  |  |  |
|---|---|---|---|---|---|---|---|---|
| weight average molecular weight prior to modification (×10⁴) | 20 | 20 | 19 | 19 | 20 | 19 | 20 | 27 |
| Mooney viscosity (ML1+4, 100° C.) | 46 | 58 | 68 | 74 | 61 | 63 | 68 | 52 |
| cold flow value (mg/minute) | 0.2 | 0.2 | 0.2 | 0.1 | 0.2 | 0.2 | 0.2 | 0.2 |

|  |  | Example 17 | Example 18 | Comparative Example 1 | Comparative Example 2 | Comparative Example 3 | Comparative Example 4 |
|---|---|---|---|---|---|---|---|
|  |  |  |  | type of modified conjugated diene rubber |  |  |  |
|  |  | Q | R | S | T | U | V |
| [properties of modified conjugated diene rubber] |  |  |  |  |  |  |  |
| bonded styrene content | (mass %) | 10 | 10 | 25 | 25 | 25 | 36 |
| vinyl content | (%) | 40 | 41 | 56 | 56 | 55 | 62 |
| glass-transition temperature | (° C.) | −60 | −60 | −31 | −30 | −30 | −13 |
| weight average molecular weight prior to modification (×10⁴) |  | 18 | 18 | 20 | 20 | 20 | 27 |
| Mooney viscosity | (ML1+4, 100° C.) | 71 | 66 | 60 | 58 | 15 | 49 |
| cold flow value | (mg/minute) | 0.1 | 0.2 | 0.2 | 0.3 | ≥10 | 0.4 |

|  |  | Comparative Example 5 | Comparative Example 6 | Comparative Example 7 |
|---|---|---|---|---|
|  |  | type of modified conjugated diene rubber |  |  |
|  |  | W | X | Y |
| [properties of modified conjugated diene rubber] |  |  |  |  |
| bonded styrene content | (mass %) | 25 | 25 | 25 |
| vinyl content | (%) | 55 | 56 | 55 |
| glass-transition temperature | (° C.) | −31 | −31 | −37 |
| weight average molecular weight prior to modification (×10⁴) |  | 20 | 20 | 20 |
| Mooney viscosity | (ML1+4, 100° C.) | 43 | 53 | 50 |
| cold flow value | (mg/minute) | 0.7 | 0.4 | 0.2 |

TABLE 3

| compounding recipe (phr) | I | II |
|---|---|---|
| modified conjugated diene rubber | 70 | 96.25 |
| butadiene rubber *1) |  | 30 |
| natural rubber | 30 |  |
| extender oil *2) | 37.5 | 11.25 |
| carbon black *3) | 5.6 | 5.6 |
| silica *4) | 70 | 70 |
| silane coupling agent *5) | 5.6 | 5.6 |
| stearic acid | 2.0 | 2.0 |
| ageing inhibitor *6) | 1.0 | 1.0 |
| zinc oxide | 3.0 | 3.0 |
| vulcanization accelerator CZ *7) | 1.8 | 1.8 |
| vulcanization accelerator D *8) | 1.5 | 1.5 |
| sulfur | 1.5 | 1.5 |

*1) BR01 manufactured by JSR Corporation
*2) SNH46 manufactured by Sankyo Yuka Kogyo Kabushiki Kaisha
*3) DIABLACK N339 manufactured by Mitsubishi Chemical Corporation
*4) NipsilAQ manufactured by Tosoh Silica Corporation
*5) Si69 manufactured by Evonik Industries
*6) NOCRAC 810NA manufactured by Ouchi Shinko Chemical Industrial
*7) NOCCELER CZ manufactured by Ouchi Shinko Chemical Industrial
*8) NOCCELER D manufactured by Ouchi Shinko Chemical Industrial

TABLE 4

|  |  | Example 1 | Example 2 | Example 3 | Example 4 | Example 5 | Example 6 | Example 7 |
|---|---|---|---|---|---|---|---|---|
|  |  | type of modified conjugated diene rubber |  |  |  |  |  |  |
|  |  | A | B | C | D | E | F | G |
| [properties of crosslinked rubber composition] |  |  |  |  |  |  |  |  |
| compounding recipe |  | I | I | I | I | I | I | I |
| Mooney viscosity | (ML1+4, 100° C.) | 78 | 83 | 69 | 74 | 76 | 67 | 69 |
| tensile strength | (index) | 110 | 109 | 105 | 106 | 106 | 104 | 103 |
| 0° C. tan δ | (index) | 134 | 144 | 132 | 130 | 131 | 134 | 127 |
| 70° C. tan δ | (index) | 138 | 141 | 143 | 134 | 137 | 137 | 130 |
| wear resistance | (index) | 115 | 113 | 109 | 107 | 106 | 105 | 106 |

TABLE 4-continued

|  |  | Example 8 | Example 9 | Example 10 | Example 11 | Example 12 | Example 13 | Example 14 |
|---|---|---|---|---|---|---|---|---|
|  |  | \multicolumn{7}{c}{type of modified conjugated diene rubber} |
|  |  | H | I | J | K | L | M | N |
| [properties of crosslinked rubber composition] | | | | | | | | |
| compounding recipe | | I | I | I | I | I | I | I |
| Mooney viscosity | (ML1+4, 100° C.) | 86 | 77 | 79 | 85 | 87 | 76 | 83 |
| tensile strength | (index) | 114 | 106 | 108 | 114 | 111 | 108 | 104 |
| 0° C. tan δ | (index) | 131 | 129 | 133 | 142 | 146 | 143 | 141 |
| 70° C. tan δ | (index) | 134 | 133 | 135 | 142 | 153 | 149 | 147 |
| wear resistance | (index) | 112 | 106 | 119 | 117 | 126 | 114 | 115 |

|  |  | Example 15 | Example 16 | Example 17 | Example 18 | Comparative Example 1 | Comparative Example 2 | Comparative Example 3 |
|---|---|---|---|---|---|---|---|---|
|  |  | \multicolumn{7}{c}{type of modified conjugated diene rubber} |
|  |  | O | P | Q | R | S | T | U |
| [properties of crosslinked rubber composition] | | | | | | | | |
| compounding recipe | | I | II | I | I | I | I | I |
| Mooney viscosity | (ML1+4, 100° C.) | 82 | 86 | 70 | 68 | 70 | 68 | 55 |
| tensile strength | (index) | 108 | 114 | 106 | 104 | 110 | 108 | 108 |
| 0° C. tan δ | (index) | 144 | 129 | 131 | 132 | 123 | 121 | 123 |
| 70° C. tan δ | (index) | 148 | 131 | 141 | 140 | 125 | 125 | 127 |
| wear resistance | (index) | 119 | 112 | 110 | 108 | 105 | 106 | 101 |

|  |  | Comparative Example 4 | Comparative Example 5 | Comparative Example 6 | Comparative Example 7 |
|---|---|---|---|---|---|
|  |  | \multicolumn{4}{c}{type of modified conjugated diene rubber} |
|  |  | V | W | X | Y |
| [properties of crosslinked rubber composition] | | | | | | |
| compounding recipe | | II | I | I | I |
| Mooney viscosity | (ML1+4, 100° C.) | 84 | 59 | 63 | 52 |
| tensile strength | (index) | 112 | 101 | 103 | 100 |
| 0° C. tan δ | (index) | 114 | 104 | 103 | 100 |
| 70° C. tan δ | (index) | 118 | 105 | 103 | 100 |
| wear resistance | (index) | 108 | 101 | 101 | 100 |

The invention claimed is:

1. A method of producing a modified conjugated diene rubber, the method comprising:
   (a) reacting a first alkoxysilane compound comprising a group, which is a protected group protected from an alkali metal or alkaline-earth metal active terminal of a conjugated diene polymer, and after deprotection, is convertible to onium by an onium generator, and an alkoxysilyl group comprising at least two alkoxy groups, with the conjugated diene polymer comprising the alkali metal or alkaline-earth metal active terminal and obtained by polymerizing a conjugated diene compound or a conjugated diene compound and an aromatic vinyl compound, thereby obtaining a modified conjugated diene polymer comprising the group convertible to onium and the alkoxysilyl group; and
   (b) mixing the modified conjugated diene polymer with an onium generator and a second alkoxysilane compound comprising an alkoxysilyl group and a group convertible to onium by the onium generator; and
   (c) bringing a mixture obtained in (b) into contact with water.

2. The method of claim 1, wherein the group convertible to onium in the first alkoxysilane compound is at least one selected from the group consisting of a nitrogenous group obtained by substituting two hydrogen atoms on a primary amine with two protective groups, a nitrogenous group obtained by substituting one hydrogen atom on a secondary amine with one protective group, a tertiary amino group, an imino group, a pyridyl group, a phosphorous-comprising group obtained by substituting two hydrogen atoms of a primary phosphine with two protective groups, a phosphorous-comprising group obtained by substituting one hydrogen atom of a secondary phosphine with one protective group, a tertiary phosphino group, and a sulfur-comprising group obtained by substituting one hydrogen atom on a thiol with one protective group.

3. The method of claim 1, wherein the onium generator is at least one selected from the group consisting of a silicon halide compound, a tin halide compound, an aluminum halide compound, a titanium halide compound, a zirconium halide compound, a germanium halide compound, a gallium halide compound, a zinc halide compound, a sulfate ester, a phosphate ester, a carboxylic acid, and a sulfonic acid.

4. The method of claim 1, wherein the group convertible to onium in the second alkoxysilane compound is at least one selected from the group consisting of a primary amino group, a secondary amino group, a tertiary amino group, an imino group, a pyridyl group, a primary phosphino group, a secondary phosphino group, a tertiary phosphino group, and a thiol group.

5. The method of claim 1, wherein the modified conjugated diene rubber comprises the modified conjugated diene polymer, the second alkoxysilane compound, and a hydrolysis and condensation product from the modified conjugated diene polymer and the second alkoxysilane compound, and has onium structures formed by the modified conjugated diene polymer, the second alkoxysilane compound, and the hydrolysis and condensation product.

6. A modified conjugated diene rubber obtained by the method of claim 1.

7. A rubber composition, comprising:
the modified conjugated diene rubber of claim 6;
at least one selected from the group consisting of a silica and a carbon black; and
a crosslinking agent.

8. A crosslinked rubber composition obtained by crosslinking the rubber composition of claim 7.

9. A tire, comprising the crosslinked rubber composition of claim 8.

10. The method of claim 1, wherein the onium generator is a silicon halide compound.

11. The method of claim 1, wherein the onium generator is a tin halide compound.

12. The method of claim 1, wherein the onium generator is an aluminum halide compound.

13. The method of claim 1, wherein the onium generator is a titanium halide compound.

14. The method of claim 1, wherein the onium generator is a zirconium halide compound.

15. The method of claim 1, wherein the onium generator is a germanium halide compound.

16. The method of claim 1, wherein the onium generator is a gallium halide compound.

17. The method of claim 1, wherein the onium generator is a zinc halide compound.

18. The method of claim 1, wherein the onium generator is at least one selected from the group consisting of a sulfate ester or a phosphate ester.

19. The method of claim 1, wherein the onium generator is at least one selected from the group consisting of a carboxylic acid and a sulfonic acid.

* * * * *